United States Patent
Zhao et al.

(10) Patent No.: US 11,564,246 B2
(45) Date of Patent: Jan. 24, 2023

(54) INFORMATION TRANSMISSION METHOD, COMMUNICATIONS DEVICE, AND NETWORK DEVICE

(71) Applicant: HUAWEI TECHNOLOGIES CO., LTD., Guangdong (CN)

(72) Inventors: Yue Zhao, Beijing (CN); Zheng Yu, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/094,363

(22) Filed: Nov. 10, 2020

(65) Prior Publication Data
US 2021/0058960 A1 Feb. 25, 2021

Related U.S. Application Data

(63) Continuation of application No. PCT/CN2018/086617, filed on May 11, 2018.

(51) Int. Cl.
H04W 72/12 (2009.01)

(52) U.S. Cl.
CPC ... H04W 72/1289 (2013.01); H04W 72/1268 (2013.01)

(58) Field of Classification Search
None
See application file for complete search history.

(56) References Cited

U.S. PATENT DOCUMENTS

| 2015/0372784 A1 | 12/2015 | Xu et al. |
| 2016/0323087 A1 | 11/2016 | Kim et al. |

(Continued)

FOREIGN PATENT DOCUMENTS

| CN | 102265695 A | 11/2011 |
| CN | 102412880 A | 4/2012 |

(Continued)

OTHER PUBLICATIONS

3GPP TS 36.213 V14.3.0 (Jun. 2017),3rd Generation Partnership Project;Technical Specification Group Radio Access Network;Evolved Universal Terrestrial Radio Access (E-UTRA);Physical layer procedures(Release 14), total 460 pages.

(Continued)

*Primary Examiner* — Anh Vu H Ly
(74) *Attorney, Agent, or Firm* — Womble Bond Dickinson (US) LLP

(57) ABSTRACT

An information transmission method, a communications device, and a network device are provided. The information transmission method includes: receiving first downlink control information, wherein the first downlink control information comprises scheduling information used to transmit first data, and the format of the first downlink control information is DCI format 6-0B, the first downlink control information comprises indication information, and the indication information is used to indicate that the first data transmitted by the communications device is a first message 3 or a second message 3; and transmitting the first data based on the scheduling information and the indication information. The method and apparatus may be applied to a communications system such as a V2X communications system, an LTE-V communications system, a V2V communications system, an internet of vehicles communications system, an MTC communications system, an IoT communications system, an LTE-M communications system, or an M2M communications system.

4 Claims, 7 Drawing Sheets

(56) References Cited

U.S. PATENT DOCUMENTS

2017/0215207 A1    7/2017   Yi et al.
2019/0045554 A1*   2/2019   Ye ..................... H04L 5/0007
2020/0059390 A1*   2/2020   Zhang ................ H04L 1/0072

FOREIGN PATENT DOCUMENTS

| | | |
|---|---|---|
| CN | 103796327 A | 5/2014 |
| CN | 104539404 A | 4/2015 |
| CN | 104756428 A | 7/2015 |
| CN | 105325042 A | 2/2016 |
| CN | 106686750 A | 5/2017 |
| CN | 107347002 A | 11/2017 |
| CN | 107733553 A | 2/2018 |
| CN | 107734692 A | 2/2018 |
| CN | 108012337 A | 5/2018 |
| JP | 2015136191 A | 7/2015 |
| WO | 2011160545 A1 | 12/2011 |
| WO | 2013006198 A1 | 1/2013 |

OTHER PUBLICATIONS

3GPP TS 36.213 V15.1.0 (Mar. 2018),3rd Generation Partnership Project;Technical Specification Group Radio Access Network;Evolved Universal Terrestrial Radio Access (E-UTRA);Physical layer procedures(Release 15), total 501 pages.
ZTE, Sanechips, Remaining issues on UL HARQ-ACK feedback for MTC. 3GPP TSG RAN WG1 Meeting #92bis, Sanya, China, Apr. 16-20, 2018, R1-1804175, 6 pages.

* cited by examiner

INFORMATION TRANSMISSION METHOD, COMMUNICATIONS DEVICE, AND NETWORK DEVICE

CROSS-REFERENCE TO RELATED APPLICATIONS

This application is a continuation of International Application No. PCT/CN2018/086617, filed on May 11, 2018, the disclosure of which is herein incorporated by reference in its entirety.

TECHNICAL FIELD

Embodiments of this application relate to the communications field, and in particular, to an information transmission method, a communications device, and a network device.

BACKGROUND

Currently, large-scale application and deployment of wireless communications systems can provide various types of communication, for example, voice, data, and multimedia services, for a plurality of users.

In a current discussion process of a long term evolution (LTE) technology, in view of a third message, namely, a Msg3, in a random access process, uplink user data can be transmitted in the Msg3. This involves using a media access control protocol (MAC) random access response (RAR).

In the prior art, when a quantity of hybrid automatic repeat request ( ) retransmissions of the Msg3 reaches a maximum quantity of retransmissions, if a base station still cannot perform decoding successfully, user equipment (UE) needs to retransmit a preamble sequence.

According to the prior art, the UE can reselect a physical random access channel (PRACH) resource only after the quantity of the retransmissions reaches the maximum quantity of the retransmissions, to complete random access. According to the prior art, the UE needs to perform a plurality of retransmissions, and this wastes transmission resources.

SUMMARY

Embodiments of this application provide an information transmission method, a communications device, and a network device, to reduce power consumption of a communications device.

According to a first aspect, an embodiment of this application provides an information transmission method. The method includes:

A communications device receives first downlink control information, where the first downlink control information includes scheduling information used by the communications device to transmit first data;

the communications device obtains indication information in the first downlink control information, where the indication information is used to indicate that the first data transmitted by the communications device is a first message 3 or a second message 3, where the first message 3 is a message 3 that does not carry user data, and the second message 3 is a message 3 that carries the user data; or the first message 3 is a message 3 that carries user data, and the second message 3 is a message 3 that carries the user data, in this case, a transport block size TBS used to transmit the first message 3 is a TBS used when the communications device transmits an initial message 3, and a TBS used to transmit the second message 3 is a TBS configured by a network device; and a bit length of the indication information is 1 bit; and a format of the first downlink control information is the same as that of second downlink control information, the second downlink control information includes scheduling information used by the communications device to transmit second data, and the second downlink control information does not include the indication information; and the communications device transmits the first data based on the scheduling information and the indication information.

In this embodiment of this application, the communications device may include a device such as a terminal device or a chip. An example in which the communications device is the terminal device is used. The terminal device receives the first downlink control information, the first downlink control information includes the scheduling information used by the terminal device to transmit the first data, and the second downlink control information includes the scheduling information used by the terminal device to transmit the second data. In addition, the first downlink control information includes the indication information, while the second downlink control information does not include the indication information, and the format of the first downlink control information is the same as that of the second downlink control information. The indication information in the first downlink control information may be used to indicate that the first data transmitted by the terminal device is the first message 3 or the second message 3. Therefore, in this embodiment of this application, in view of the first downlink control information transmitted each time, it may be determined, by using the indication information, that the transmitted first data is the first message 3 or the second message 3, and a quantity of transmissions does not need to reach a maximum quantity of HARQ retransmissions configured in a network. Therefore, it may be determined whether to fall back from transmitting the second message 3 to transmitting the first message 3, so that a fallback latency is reduced, and power consumption of the terminal device is reduced.

According to a second aspect, an embodiment of this application provides an information transmission method. The method includes:

A network device sends first downlink control information, where the first downlink control information includes scheduling information used by a communications device to transmit first data; and the first downlink control information includes indication information, and the indication information is used to indicate that the first data transmitted by the communications device is a first message 3 or a second message 3, where the first message 3 is a message 3 that does not carry user data, and the second message 3 is a message 3 that carries the user data; or the first message 3 is a message 3 that carries user data, and the second message 3 is a message 3 that carries the user data, in this case, a transport block size TBS used to transmit the first message 3 is a TBS used when the communications device transmits an initial message 3, and a TBS used to transmit the second message 3 is a TBS configured by the network device; and a bit length of the indication information is 1 bit; and a format of the first downlink control information is the same as that of second downlink control information, the second downlink control information includes scheduling information used by the communications device to transmit second data, and the second downlink control information does not include the indication information; and the network device receives the first data transmitted by the communications device.

In this embodiment of this application, the network device sends the first downlink control information, the first downlink control information includes the scheduling information used by a terminal device to transmit the first data, and the second downlink control information includes the scheduling information used by the terminal device to transmit the second data. In addition, the first downlink control information includes the indication information, while the second downlink control information does not include the indication information, and the format of the first downlink control information is the same as that of the second downlink control information. The indication information in the first downlink control information may be used to indicate that the first data transmitted by the terminal device is the first message 3 or the second message 3. Therefore, in this embodiment of this application, in view of the first downlink control information transmitted each time, it may be determined, by using the indication information, that the transmitted first data is the first message 3 or the second message 3, and a quantity of transmissions does not need to reach a maximum quantity of HARQ retransmissions configured in a network. Therefore, it may be determined whether to fall back from transmitting the second message 3 to transmitting the first message 3, so that a fallback latency is reduced, and power consumption of the terminal device is reduced.

In an embodiment, the communications device is at a coverage enhancement level 0 or a coverage enhancement level 1, or in a coverage enhancement mode A;

the first downlink control information further includes a first resource allocation field, and the first resource allocation field includes at least $$\left\lceil \log_2 \left\lfloor \frac{N_{RB}^{UL}}{6} \right\rfloor \right\rceil + 4 \text{ bits,}$$

where the $$\left\lceil \log_2 \left\lfloor \frac{N_{RB}^{UL}}{6} \right\rfloor \right\rceil$$

bits in the first resource allocation field indicate an index of a narrowband in an uplink bandwidth, and the 4 bits in the first resource allocation field indicate resource block allocation within the narrowband corresponding to the index of the narrowband; and the second downlink control information further includes a second resource allocation field, and the second resource allocation field includes at least $$\left\lceil \log_2 \left\lfloor \frac{N_{RB}^{UL}}{6} \right\rfloor \right\rceil + 5 \text{ bits,}$$

where the $$\left\lceil \log_2 \left\lfloor \frac{N_{RB}^{UL}}{6} \right\rfloor \right\rceil$$

bits in the second resource allocation field indicate an index of a narrowband in an uplink bandwidth, and the 5 bits in the second resource allocation field indicate resource block allocation within the narrowband corresponding to the index of the narrowband; and/or the first downlink control information further includes a first modulation and coding scheme field, a bit length of the first modulation and coding scheme field is H bits, the second downlink control information further includes a second modulation and coding scheme field, a bit length of the second modulation and coding scheme field is H+1 bits, and H is a positive integer greater than or equal to 1; and/or the first downlink control information does not include a channel state information CSI request field, and the second downlink control information includes the CSI request field; and/or the first downlink control information does not include a sounding reference signal SRS request field, and the second downlink control information includes the SRS request field.

In some embodiments of this application, when the terminal device is at the coverage enhancement level 0 or the coverage enhancement level 1, or in the coverage enhancement mode A, the first downlink control information further includes the first resource allocation field. For example, the first resource allocation field may be resource allocation in a DCI format 6-0A, the first resource allocation field includes at least the $$\left\lceil \log_2 \left\lfloor \frac{N_{RB}^{UL}}{6} \right\rfloor \right\rceil + 4 \text{ bits,}$$

$N_{RB}^{UL}$ indicates a quantity of uplink physical resource blocks (PRB) that are included in a system bandwidth, $\lfloor \ \rfloor$ indicates a rounding down operation, and $\lceil \ \rceil$ indicates a rounding up operation. The $$\left\lceil \log_2 \left\lfloor \frac{N_{RB}^{UL}}{6} \right\rfloor \right\rceil$$

bits in the first resource allocation field indicate the index of the narrowband in the uplink bandwidth, and the 4 bits in the first resource allocation field indicate the resource block allocation within the narrowband corresponding to the index of the narrowband.

The second downlink control information further includes the second resource allocation field, and the second resource allocation field includes at least the $$\left\lceil \log_2 \left\lfloor \frac{N_{RB}^{UL}}{6} \right\rfloor \right\rceil + 5 \text{ bits.}$$

The $$\left\lceil \log_2 \left\lfloor \frac{N_{RB}^{UL}}{6} \right\rfloor \right\rceil$$

bits in the second resource allocation field indicate the index of the narrowband in the uplink bandwidth, and the 5 bits in the second resource allocation field indicate the resource block allocation within the narrowband corresponding to the index of the narrowband.

Therefore, the first resource allocation field in the first downlink control information is 1 bit fewer than the second resource allocation field in the second downlink control information, the 1 bit is used for the indication information in the first downlink control information, and the first downlink control information and the second downlink control information have a same format. In this embodiment of this application, without additionally increasing overheads of the first downlink control information, the indication information in the first downlink control information supports fallback to the first message 3 in advance, so that a fallback latency is reduced, and power consumption of the terminal device is reduced.

In some embodiments of this application, the first downlink control information further includes the first modulation and coding scheme field. For example, the first modulation and coding scheme field is an MCS in the DCI format 6-0A, and a bit length of the first modulation and coding scheme field is H bits. The second downlink control information further includes the second modulation and coding scheme field, and a bit length of the second modulation and coding scheme field is H+1 bits. H is a positive integer greater than or equal to 1.

Therefore, the first modulation and coding scheme field in the first downlink control information is 1 bit fewer than the second modulation and coding scheme field in the second downlink control information, the 1 bit is used for the indication information in the first downlink control information, and the first downlink control information and the second downlink control information have a same format. In this embodiment of this application, without additionally increasing overheads of the first downlink control information, the indication information in the first downlink control information supports fallback to the first message 3 in advance, so that a fallback latency is reduced, and power consumption of the terminal device is reduced.

In some embodiments of this application, the first downlink control information does not include a CSI request field, and the second downlink control information includes the CSI request field. For example, the CSI request field may be a CSI request in the DCI format 6-0A. Therefore, compared with the second downlink control information, the first downlink control information does not include the CSI request field, the CSI request field that the first downlink control information does not include is used for the indication information in the first downlink control information, and the first downlink control information and the second downlink control information have a same format. In this embodiment of this application, without additionally increasing overheads of the first downlink control information, the indication information in the first downlink control information supports fallback to the first message 3 in advance, so that a fallback latency is reduced, and power consumption of the terminal device is reduced.

For example, when a base station schedules the second message 3 or the first message 3, the base station does not schedule UE to report CSI. Therefore, the first downlink control information may not include the CSI. The CSI request field in the DCI format 6-0A is used as the indication information, and the indication information may be used to indicate to send the second message 3, or fall back to sending the first message 3. For example, the indication information may be used to indicate to retransmit an EDT Msg3 or fall back to a legacy Msg3.

In some embodiments of this application, the first downlink control information does not include an SRS request field, and the second downlink control information includes the SRS request field. For example, the CSI request field may be an SRS request in the DCI format 6-0A. Therefore, compared with the second downlink control information, the first downlink control information does not include the SRS request field, the SRS request field that the first downlink control information does not include is used for the indication information in the first downlink control information, and the first downlink control information and the second downlink control information have a same format. In this embodiment of this application, without additionally increasing overheads of the first downlink control information, the indication information in the first downlink control information supports fallback to the first message 3 in advance, so that a fallback latency is reduced, and power consumption of the terminal device is reduced.

In an embodiment,
the communications device is at a coverage enhancement level 2 or a coverage enhancement level 3, or in a coverage enhancement mode B; and
the first downlink control information further includes a first modulation and coding scheme field, a bit length of the first modulation and coding scheme field is T bits, the second downlink control information further includes a second modulation and coding scheme field, a bit length of the second modulation and coding scheme field is T+1 bits, and T is a positive integer greater than or equal to 1.

Therefore, the first modulation and coding scheme field in the first downlink control information is 1 bit fewer than the second modulation and coding scheme field in the second downlink control information, the 1 bit is used for the indication information in the first downlink control information, and the first downlink control information and the second downlink control information have a same format. In this embodiment of this application, without additionally increasing overheads of the first downlink control information, the indication information in the first downlink control information supports fallback to the first message 3 in advance, so that a fallback latency is reduced, and power consumption of the terminal device is reduced.

In an embodiment,
the communications device is at a coverage enhancement level 2 or a coverage enhancement level 3, or in a coverage enhancement mode B; and
the first downlink control information further includes a first modulation and coding scheme field, the indication information is carried by the first modulation and coding scheme field, a bit length of the first modulation and coding scheme field is 4 bits, and when a bit state of the first modulation and coding scheme field is a state belongs to 0000 to 1010, the first data transmitted by the communications device is the first message 3, or when a bit state of the first modulation and coding scheme field is a state belongs to 1011 to 1111, the first data transmitted by the communications device is the second message 3.

The first modulation and coding scheme field is a modulation and coding scheme in a DCI format 6-0B, and has 4 bits. When the indication information in the first downlink control information is carried by the first modulation and coding scheme field, the bit length of the first modulation and coding scheme field is 4 bits, and the bit state of the first modulation and coding scheme field is a state in 0000 to 1010, a state in 0000 to 1010 may be used to indicate that the first data transmitted by the terminal device is the first message 3, and the bit state indicates the transport block size of the first message 3. When the bit state of the first modulation and coding scheme field is a state in 1011 to 1111, a state in 0000 to 1010 may be used to indicate that the first data transmitted by the terminal device is the second message 3. For example, a preset state 1111, a preset state 1110, or a preset state 1011 indicates that the first data transmitted by the terminal device is the second message 3.

In an embodiment, when a bit state of the indication information is a first bit state, the communications device sends the second message 3 based on a first TBS, or when a bit state of the indication information is a second bit state, the communications device sends the first message 3 or the communications device sends the second message 3 based on a second TBS; or when a bit state of the indication information is a first bit state, the communications device sends the second message 3 based on a second TBS, or when a bit state of the indication information is a second bit state, the communications device sends the first message 3 or the communications device sends the second message 3 based on a first TBS, where the first TBS is a TBS determined based on the second TBS, and the second TBS is a TBS configured by the network device.

For example, the second TBS may be a largest TBS configured by the network device, and the indication information may have two bit states: the first bit state and the second bit state. For example, the first bit state may be 0, and the second bit state may be 1. Alternatively, the first bit state may be 1, and the second bit state may be 0. The second message 3 carries the user data. When the bit state of the indication information is the first bit state, the terminal device sends the second message 3 based on the first TBS. For example, the first TBS is smaller than or equal to the largest transport block size configured by the network device. When the bit state of the indication information is the second bit state, the terminal device sends the first message 3 or the terminal device sends the second message 3 based on the second TBS. In other words, when the bit state of the indication information is the second bit state, the terminal device may fall back from transmitting the second message 3 to transmitting the first message 3, or may send the second message 3 based on the TBS (namely, the second TBS) configured by the network device. For example, when the bit state of the indication information is 1, it indicates that the first message 3 is transmitted, or when the bit state of the indication information is 0, it indicates that the second message 3 is transmitted. Different bit states of the indication information may be used to indicate the terminal whether to perform EDT fallback, to be specific, to fall back from the EDT Msg3 to the legacy Msg3, without requiring the terminal device to retransmit a random access preamble sequence that is used to indicate the legacy Msg3 after the terminal device performs a plurality of HARQ retransmissions, and the base station schedules the legacy Msg3 based on the transmitted random access preamble sequence, so that a fallback latency is reduced and power consumption of the terminal device is reduced.

In an embodiment, when the bit state of the indication information is the first bit state, a resource allocation field in the first downlink control information includes at least $$\left\lceil \log_2 \left\lfloor \frac{N_{RB}^{UL}}{6} \right\rfloor \right\rceil + X \text{ bits,}$$

where the $$\left\lceil \log_2 \left\lfloor \frac{N_{RB}^{UL}}{6} \right\rfloor \right\rceil$$

bits in the resource allocation field indicate an index of a narrowband in an uplink bandwidth, and the X bits in the resource allocation field indicate resource allocation within the narrowband; or when the bit state of the indication information is the second bit state, a resource allocation field in the first downlink control information includes at least $$\left\lceil \log_2 \left\lfloor \frac{N_{RB}^{UL}}{6} \right\rfloor \right\rceil \text{ bits,}$$

where the $$\left\lceil \log_2 \left\lfloor \frac{N_{RB}^{UL}}{6} \right\rfloor \right\rceil$$

bits in the resource allocation field indicate an index of a narrowband in an uplink bandwidth, the first downlink control information further includes Y bits, each of M×L states of the Y bits indicates that the first data transmitted by the communications device is the first message 3, and each of the M×L states of the Y bits indicates a modulation and coding scheme and resource allocation within a narrowband, where there are a total of M resource allocation modes of the resource allocation within the narrowband, there are a total of L indexes of the modulation and coding scheme, M and L are positive integers, one or more other states than the M×L states of the Y bits indicate that the first data transmitted by the communications device is the second message 3.

For example, when the terminal device is at the coverage enhancement level 0 or the coverage enhancement level 1, or in the coverage enhancement mode A, and the bit state of the indication information is 0, a length of the resource allocation field in the first downlink control information is $$\left\lceil \log_2 \left\lfloor \frac{N_{RB}^{UL}}{6} \right\rfloor \right\rceil + 5 \text{ bits.}$$

When the bit state of the indication information is 1, the first downlink control information includes 8 bits, the 8 bits indicate 256 states, and 252 states of the 256 states are used to indicate combinations of the modulation and coding scheme and the resource allocation within the narrowband. There are 21 states of the resource allocation within the narrowband, and there are a total of 12 index values including K to (K+10) and M for the coding scheme. When the bit state indicates that the index value of the modulation and coding scheme is one value in K to (K+10), the terminal device transmits the first message 3, or when the index value of the modulation and coding scheme is M, the terminal device transmits the second message 3. K and M are integers. For example, K is 0, and M is 11.

It should be noted that, in this embodiment of this application, states of the MCS in the prior art are limited from 16 to 12, and the 21 states of the resource allocation within the narrowband are still maintained. In this case, there are 12×21=252 states, and 8 bits are required for joint coding by using the MCS and the resource allocation. Compared with 4 bits of the MCS in the prior art, 5 bits are for the resource allocation within the narrowband. In other words, there are a total of 9 bits in the prior art. In this embodiment of this application, only 8 bits are required after the MCS and the resource allocation are jointly encoded. Therefore, 1 bit can be saved. The 1 bit that is saved is used as the indication information. For example, the indication information may be a flag. If the flag is 0, it indicates EDT retransmission, and a TBS size for the retransmission is adaptively selected by the UE. If the flag is 1 and the indicated index value of the MCS is a predefined value A, it indicates EDT retransmission, and a retransmitted TBS is a largest TBS configured by the network device. If the flag is 1 and index values of the MCS that are indicated are 11 values other than the value A in the 12 values of the MCS, it indicates that the EDT Msg3 falls back to the legacy Msg3. In this case, the transport block size of the legacy Msg3 is determined based on the indicated index value of the MCS.

For example, when the terminal device is at the coverage enhancement level 2 or the coverage enhancement level 3, or in the coverage enhancement mode B, and the bit state of the indication information is 0, a length of the resource allocation field in the first downlink control information is $$\left\lceil \log_2 \left\lfloor \frac{N_{RB}^{UL}}{6} \right\rfloor \right\rceil + 3 \text{ bits.}$$

When the bit state of the indication information is 1, the first downlink control information includes 6 bits, the 6 bits indicate 64 states, and the 64 states are used to indicate combinations of the modulation and coding scheme and the resource allocation within the narrowband. There are 8 states of the resource allocation within the narrowband, and there are a total of 8 index values including Q to (Q+6) and S for the coding scheme. When the index value of the modulation and coding scheme is one value in Q to (Q+6), the terminal device transmits the first message 3, or when the index value of the modulation and coding scheme is S, the terminal device transmits the second message 3. Q and S are integers. For example, Q=0, and S=7.

It should be noted that, in this embodiment of this application, existing states of the MCS may be limited from 11 to 8, and the 8 states of the resource allocation within the narrowband are still maintained. In this case, there are 8×8=64 states, and 6 bits are required for joint coding by using the MCS and the resource allocation. Compared with the existing 4 bits that are needed for the MCS value, 3 bits are needed for the resource allocation within the narrowband, and 1 bit is saved in this embodiment of this application. The 1 bit that is saved is used as the indication information. For example, the indication information may be a flag. If the flag is 0, it indicates EDT retransmission, and a TBS size for the retransmission is adaptively selected by the UE. If the flag is 1 and the indicated index value of the MCS is a predefined value B, it indicates EDT retransmission, and a retransmitted TBS is a largest TBS configured by the network device. If the flag is 1 and index values of the MCS that are indicated are the other 7 values in the 8 values of the MCS, it indicates that the EDT Msg3 falls back to the legacy Msg3. In this case, the transport block size of the legacy Msg3 is determined based on the index value of the MCS.

In an embodiment, the format of the first downlink control information is a downlink control information DCI format 6-0A; or the format of the first downlink control information is a DCI format 6-0B.

According to a third aspect, an embodiment of this application further provides a communications device. The communications device includes:

a receiving module, configured to receive first downlink control information, where the first downlink control information includes scheduling information used by the communications device to transmit first data;

a processing module, configured to obtain indication information in the first downlink control information, where the indication information is used to indicate that the first data transmitted by the communications device is a first message 3 or a second message 3, where the first message 3 is a message 3 that does not carry user data, and the second message 3 is a message 3 that carries the user data; or the first message 3 is a message 3 that carries user data, and the second message 3 is a message 3 that carries the user data, in this case, a transport block size TBS used to transmit the first message 3 is a TBS used when the communications device transmits an initial message 3, and a TBS used to transmit the second message 3 is a TBS configured by a network device; and a bit length of the indication information is 1 bit; and a format of the first downlink control information is the same as that of second downlink control information, the second downlink control information includes scheduling information used by the communications device to transmit second data, and the second downlink control information does not include the indication information; and a sending module, configured to transmit the first data based on the scheduling information and the indication information.

According to a fourth aspect, an embodiment of this application further provides a network device. The network device includes:

a processing module, configured to send first downlink control information by using a sending module, where the first downlink control information includes scheduling information used by a communications device to transmit first data; and the first downlink control information includes indication information, and the indication information is used to indicate that the first data transmitted by the communications device is a first message 3 or a second message 3, where the first message 3 is a message 3 that does not carry user data, and the second message 3 is a message 3 that carries the user data; or the first message 3 is a message 3 that carries user data, and the second message 3 is a message 3 that carries the user data, in this case, a transport block size TBS used to transmit the first message 3 is a TBS used when the communications device transmits an initial message 3, and a TBS used to transmit the second message 3 is a TBS configured by the network device; and a bit length of the indication information is 1 bit; and a format of the first downlink control information is the same as that of second downlink control information, the second downlink control information includes scheduling information used by the communications device to transmit second data, and the second downlink control information does not include the indication information; and the processing module is configured to receive, through a receiving module, the first data transmitted by the communications device.

In an embodiment, the communications device is at a coverage enhancement level 0 or a coverage enhancement level 1, or in a coverage enhancement mode A;

the first downlink control information further includes a first resource allocation field, and the first resource allocation field includes at least $$\left\lceil \log_2\left\lfloor \frac{N_{RB}^{UL}}{6} \right\rfloor \right\rceil + 4 \text{ bits},$$

where the $$\left\lceil \log_2\left\lfloor \frac{N_{RB}^{UL}}{6} \right\rfloor \right\rceil$$

bits in the first resource allocation field indicate an index of a narrowband in an uplink bandwidth, and the 4 bits in the first resource allocation field indicate resource block allocation within the narrowband corresponding to the index of the narrowband; and the second downlink control information further includes a second resource allocation field, and the second resource allocation field includes at least $$\left\lceil \log_2\left\lfloor \frac{N_{RB}^{UL}}{6} \right\rfloor \right\rceil + 5 \text{ bits},$$

where the $$\left\lceil \log_2\left\lfloor \frac{N_{RB}^{UL}}{6} \right\rfloor \right\rceil$$

bits in the second resource allocation field indicate an index of a narrowband in an uplink bandwidth, and the 5 bits in the second resource allocation field indicate resource block allocation within the narrowband corresponding to the index of the narrowband; and/or the first downlink control information further includes a first modulation and coding scheme field, a bit length of the first modulation and coding scheme field is H bits, the second downlink control information further includes a second modulation and coding scheme field, a bit length of the second modulation and coding scheme field is H+1 bits, and H is a positive integer greater than or equal to 1; and/or the first downlink control information does not include a channel state information CSI request field, and the second downlink control information includes the CSI request field; and/or the first downlink control information does not include a sounding reference signal SRS request field, and the second downlink control information includes the SRS request field.

In an embodiment, the communications device is at a coverage enhancement level 2 or a coverage enhancement level 3, or in a coverage enhancement mode B; and the first downlink control information further includes a first modulation and coding scheme field, a bit length of the first modulation and coding scheme field is T bits, the second downlink control information further includes a second modulation and coding scheme field, a bit length of the second modulation and coding scheme field is T+1 bits, and T is a positive integer greater than or equal to 1.

In an embodiment, the communications device is at a coverage enhancement level 2 or a coverage enhancement level 3, or in a coverage enhancement mode B; and the first downlink control information further includes a first modulation and coding scheme field, the indication information is carried by the first modulation and coding scheme field, a bit length of the first modulation and coding scheme field is 4 bits, and when a bit state of the first modulation and coding scheme field is a state in 0000 to 1010, the first data transmitted by the communications device is the first message 3, or when a bit state of the first modulation and coding scheme field is a state in 1011 to 1111, the first data transmitted by the communications device is the second message 3.

In an embodiment, when a bit state of the indication information is a first bit state, the communications device sends the second message 3 based on a first TBS, or when a bit state of the indication information is a second bit state, the communications device sends the first message 3 or the communications device sends the second message 3 based on a second TBS; or when a bit state of the indication information is a first bit state, the communications device sends the second message 3 based on a second TBS, or when a bit state of the indication information is a second bit state, the communications device sends the first message 3 or the communications device sends the second message 3 based on a first TBS, where the first TBS is a TBS determined based on the second TBS, and the second TBS is a TBS configured by the network device.

In an embodiment, when the bit state of the indication information is the first bit state, a resource allocation field in the first downlink control information includes at least $$\left\lceil \log_2\left\lfloor \frac{N_{RB}^{UL}}{6} \right\rfloor \right\rceil + X \text{ bits},$$

where the $$\left\lceil \log_2\left\lfloor \frac{N_{RB}^{UL}}{6} \right\rfloor \right\rceil$$

bits in the resource allocation field indicate an index of a narrowband in an uplink bandwidth, and the X bits in the resource allocation field indicate resource allocation within the narrowband; or when the bit state of the indication information is the second bit state, a resource allocation field in the first downlink control information includes at least $$\left\lceil \log_2\left\lfloor \frac{N_{RB}^{UL}}{6} \right\rfloor \right\rceil \text{ bits},$$

where the $$\left\lceil \log_2 \left\lceil \frac{N_{RB}^{UL}}{6} \right\rceil \right\rceil$$

bits in the resource allocation field indicate an index of a narrowband in an uplink bandwidth, the first downlink control information further includes Y bits, each of M×L states of the Y bits indicates that the first data transmitted by the communications device is the first message 3, and each of the M×L states of the Y bits indicates a modulation and coding scheme and resource allocation within the narrowband, where there are a total of M resource allocation modes of the resource allocation within the narrowband, there are a total of L indexes of the modulation and coding scheme, M and L are positive integers, one or more other states than the M×L states of the Y bits indicate that the first data transmitted by the communications device is the second message 3.

In an embodiment,
the format of the first downlink control information is a downlink control information DCI format 6-0A; or
the format of the first downlink control information is a DCI format 6-0B.

According to a fifth aspect, an embodiment of this application provides an information transmission method. The method includes:

a communications device receives downlink control information, where the downlink control information includes scheduling information used by the communications device to transmit first data; and the communications device determines a first transport block size TBS based on the first downlink control information, where when the first TBS is smaller than or equal to a second TBS, the first data transmitted by the communications device is a first message 3; or when the first TBS is larger than the second TBS, second data transmitted by the communications device is a second message 3, where the second TBS is a preset transport block size, or a transport block size configured by using system information, or a transport block size configured by using radio resource control signaling.

According to a sixth aspect, an embodiment of this application provides an information transmission method. The method includes:

a network device sends downlink control information, where the downlink control information includes scheduling information used by a communications device to transmit first data, and the first downlink control information is used by the communications device to determine a first transport block size TBS, where when the first TBS is smaller than or equal to a second TBS, the network device receives a first message 3; or when the first TBS is larger than the second TBS, the network device receives a second message 3, where the second TBS is a preset transport block size, or a transport block size configured by using system information, or a transport block size configured by using radio resource control signaling.

According to a seventh aspect, an embodiment of this application provides a computer-readable storage medium. The computer-readable storage medium stores an instruction, and when the instruction is run on a computer, the computer is enabled to perform the method according to the foregoing aspects.

According to an eighth aspect, an embodiment of this application provides a computer program product including an instruction. When the instruction is run on a computer, the computer is enabled to perform the method according to the foregoing aspects.

According to a ninth aspect, an embodiment of this application provides a communications device. The communications device may include an entity such as a terminal device or a chip, and the communications device includes a processor and a memory. The memory is configured to store an instruction. The processor is configured to execute the instruction in the memory, so that the communications device is enabled to perform the method according to either the first aspect or the fifth aspect.

According to a tenth aspect, an embodiment of this application provides a network device. The network device may include an entity such as a base station or a chip, and the network device includes a processor and a memory. The memory is configured to store an instruction. The processor is configured to execute the instruction in the memory, so that the network device is enabled to perform the method according to either the second or the sixth aspect.

According to an eleventh aspect, this application provides a chip system. The chip system includes a processor and is configured to support a network device or a communications device in implementing functions in the foregoing aspects, for example, sending or processing data and/or information in the foregoing method. In an embodiment, the chip system further includes a memory, and the memory is configured to store a program instruction and data that are necessary for the network device. The chip system may include a chip, or may include a chip and another discrete component.

DESCRIPTION OF EMBODIMENTS

Figure 1:
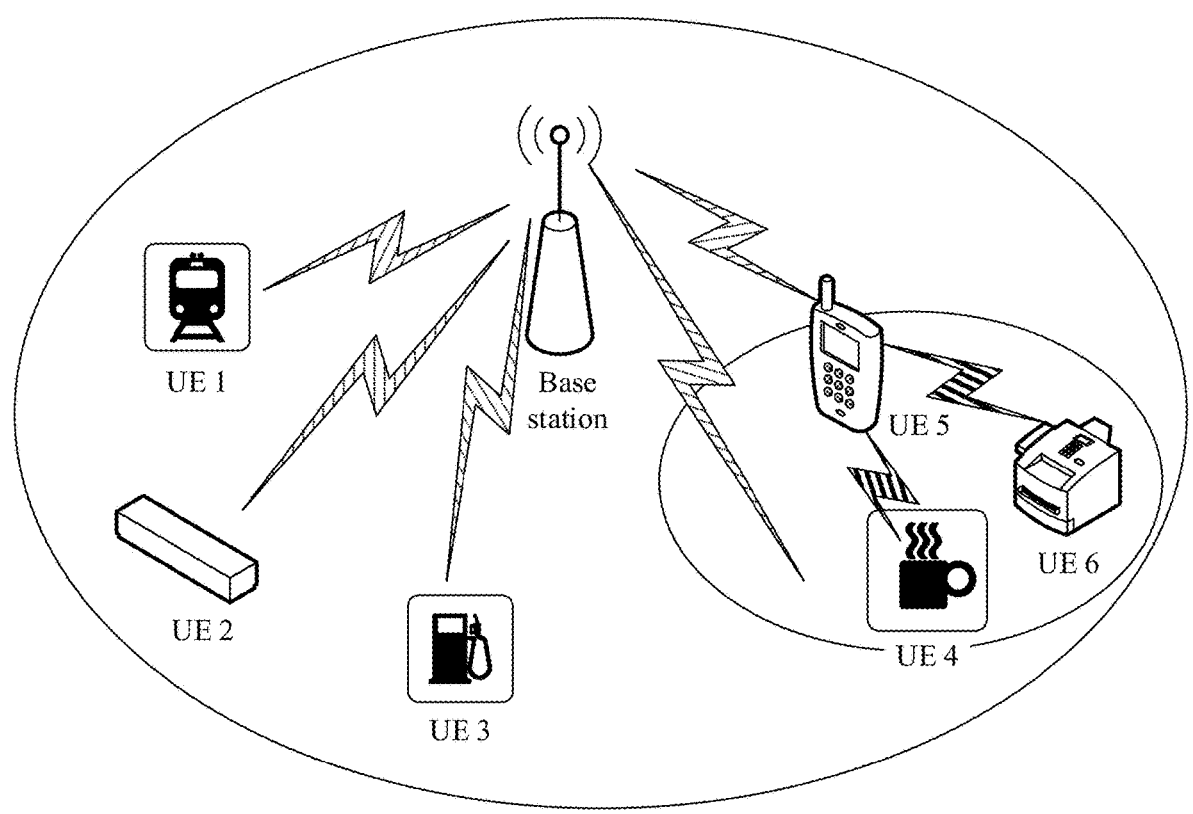
FIG. 1 is a schematic diagram of a system architecture of an information transmission method according to an embodiment of this application.

Embodiments of this application provide an information transmission method, a communications device, and a network device, to reduce power consumption of a communications device.

The following describes the embodiments of this application with reference to accompanying drawings.

In the specification, claims, and accompanying drawings of this application, the terms "first", "second", and the like are intended to distinguish between similar objects but do not necessarily indicate a specific order or sequence. It should be understood that the terms used in such a way are interchangeable in appropriate circumstances, which is merely a discrimination manner that is used when objects having a same attribute are described in the embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

Technical solutions in the embodiments of the present invention may be applied to various communications systems for data processing, for example, a code division multiple access (CDMA) system, a time division multiple access (TDMA) system, a frequency division multiple access (FDMA) system, an orthogonal frequency division multiple access (OFDMA) system, and a single carrier frequency division multiple access (SC-FDMA) system, and another system. The terms "system" and "network" can be interchanged with each other. The CDMA system can implement radio technologies such as universal terrestrial radio access (UTRA) and CDMA 2000. UTRA may include a wideband CDMA (WCDMA) technology and another technology transformed from CDMA. CDMA2000 may cover interim standard (IS) 2000 (IS-2000), IS-95, and IS-856. The TDMA system can implement wireless technologies such as global system for mobile communications (GSM). The OFDMA system can implement radio technologies such as evolved universal terrestrial radio access (E-UTRA), ultra mobile broadband (UMB), IEEE 802.11 (Wi-Fi), IEEE 802.16 (WiMAX), IEEE 802.20, and Flash OFDMA. UTRA corresponds to UMTS, and E-UTRA corresponds to an evolved version of UMTS. A new version of UMTS, namely, E-UTRA, is used in 3GPP long term evolution (LTE) and various versions evolved based on LTE. A 5th generation ("5G" for short) communications system or new radio ("NR" for short) is a next generation communications system under study. In addition, the communications system may be further applicable to a future-oriented communications technology which is applicable to the technical solutions provided in the embodiments of the present invention. System architectures and service scenarios described in the embodiments of the present invention are intended to describe the technical solutions in the embodiments of the present invention more clearly, and do not constitute any limitation on the technical solutions provided in the embodiments of the present invention. A person of ordinary skill in the art may know that with evolution of a network architecture and emergence of a new service scenario, the technical solutions provided in the embodiments of the present invention are also applicable to similar technical problems.

FIG. 1 is a schematic structural diagram of a possible radio access network (RAN for short) according to an embodiment of this application. The RAN may be a base station access system of a 2G network (to be specific, the RAN includes a base station and a base station controller), may be a base station access system of a 3G network (to be specific, the RAN includes a base station and an RNC), may be a base station access system of a 4G network (to be specific, the RAN includes an eNB and an RNC), or may be a base station access system of a 5G network.

The RAN includes one or more network devices 20. The network device 20 may be any type of device with a wireless transceiver function, or a chip disposed in a device with a wireless transceiver function. The network device 20 includes but is not limited to a base station (for example, a base station BS, a NodeB, an evolved NodeB eNodeB or eNB, a gNodeB or gNB in a 5th generation 5G communications system, a base station in a future communications system, an access node in a Wi-Fi system, a wireless relay node, or a wireless backhaul node) and the like. The base station may be a macro base station, a micro base station, a picocell base station, a small cell, a relay station, or the like. A plurality of base stations may support a network using the foregoing one or more technologies, or a future evolved network. The core network may support a network using the foregoing one or more technologies, or a future evolved network. The base station may include one or more co-site or non-co-site transmission reception points (TRP). The network device 20 may alternatively be a radio controller, a centralized unit (centralized unit, CU), a distributed unit (DU), or the like in a cloud radio access network (CRAN) scenario. The network device may alternatively be a server, a wearable device, a vehicle-mounted device, or the like. That the network device 20 is a base station is used as an example for description below. The plurality of network devices 20 may be base stations of a same type or base stations of different types. The base station may communicate with terminal devices 1 to 6, or may communicate with the terminal devices 1 to 6 through a relay station. The terminal devices 1 to 6 may support communication with a plurality of base stations using different technologies. For example, the terminal devices may support communication with a base station supporting an LTE network, may support communication with a base station supporting a 5G network, or may support a dual connection to a base station in an LTE network and a base station in a 5G network. For example, the terminal is connected to a radio access network (RAN) node of a wireless network. Currently, for example, the RAN node is a gNB, a transmission reception point (, TRP), an evolved NodeB (, eNB), a radio network controller ( ) a NodeB (NB), a base station controller (BSC), a base transceiver station (base transceiver station, BTS), a home base station (for example, a home evolved NodeB or a home NodeB, HNB), a baseband unit (BBU), or a wireless fidelity (Wi-Fi) access point (AP). In a network structure, the network device may include a centralized unit (CU) node, a distributed unit (DU) node, or a RAN device including a CU node and a DU node.

The communications devices 1 to 6 each are also referred to as user equipment (UE), a mobile station (mobile station, MS), a mobile terminal (MT), a terminal, or the like, and is a device that provides voice and/or data connectivity for a user, or is a chip disposed in the device, for example, a handheld device or a vehicle-mounted device with a wireless connection function. Currently, for example, the terminal device is a mobile, a tablet, a notebook computer, a palmtop computer, a mobile internet device (MID), a wearable device, a virtual reality (VR) device, an augmented reality (AR) device, a wireless terminal in industrial control, a wireless terminal in self-driving a wireless terminal in remote medical surgery, a wireless terminal in a smart grid, a wireless terminal in transportation safety, a wireless terminal in a smart city, a wireless terminal in a smart home, or the like.

In the embodiments of this application, the base station and the UE 1 to the UE 6 form a communications system. In the communications system, the base station sends one or more of system information, an RAR message, or a paging message to one or more of the UE 1 to the UE 6. In addition, the UE 4 to the UE 6 also form a communications system. In the communications system, the UE 5 may function as a base station, and the UE 5 may send one or more of system information, control information, or a paging message to one or more of the UE 4 and the UE 6.

Figure 2:
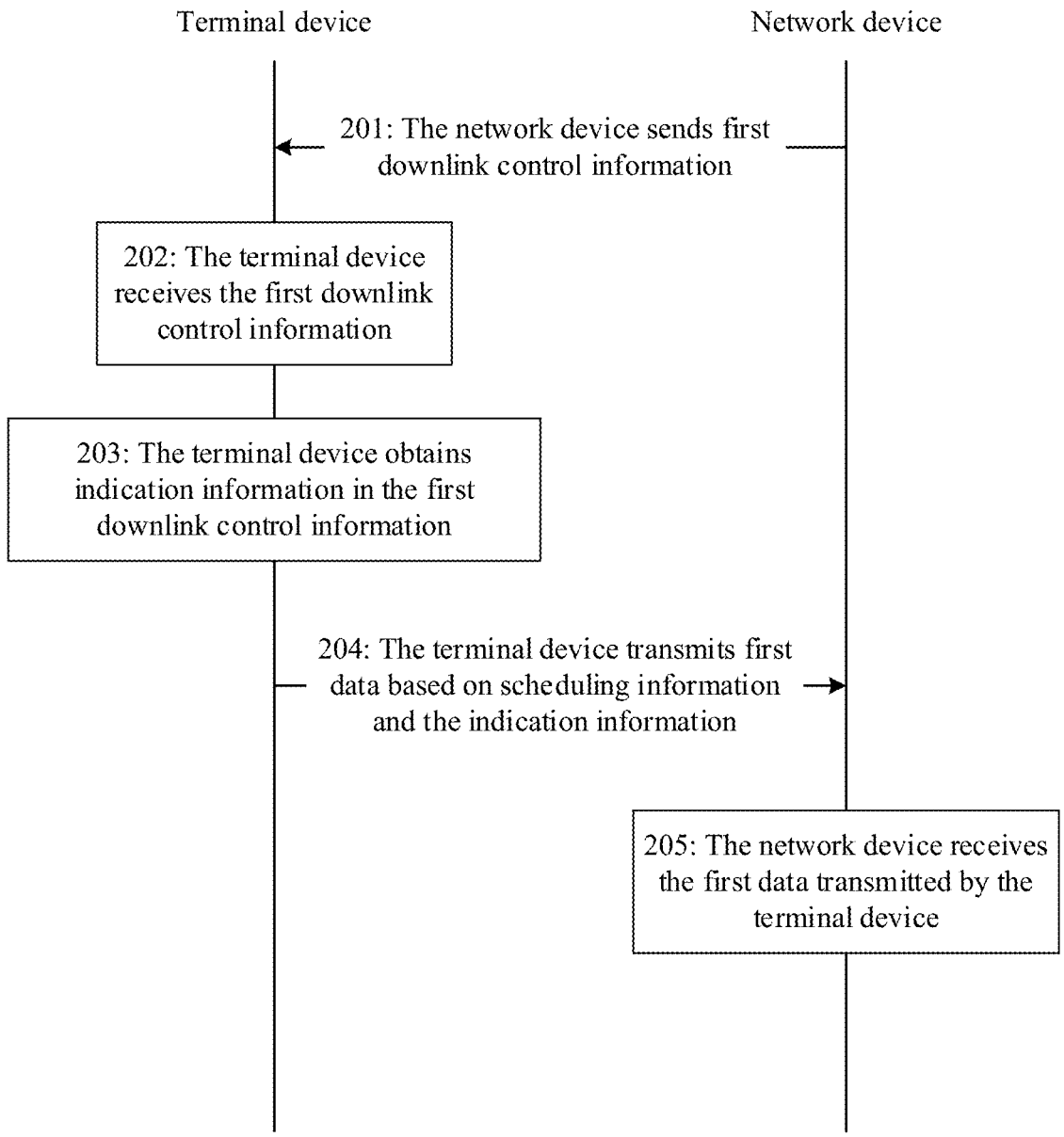
FIG. 2 is a schematic flowchart of interaction between a terminal device and a network device according to an embodiment of this application.

FIG. 2 is a schematic flowchart of interaction between a network device and a terminal device according to an embodiment of this application. An information transmission method provided in this embodiment of this application mainly includes the following operations.

201: The network device sends first downlink control information.

The first downlink control information includes scheduling information used by the terminal device to transmit first data.

In this embodiment of this application, the network device may send the first downlink control information (DCI) to the terminal device. The first downlink control information includes the scheduling information, and the scheduling information may be used to schedule the first data to be transmitted by the terminal device. The first data is a third message (namely, a message 3, which may also be referred to as a Msg3) transmitted by the terminal device. The message 3 is a third message in a random access process, and the message 3 may carry user data. For example, the message 3 may support early data transmission (EDT). Corresponding resources may be respectively configured for a plurality of types of messages that can be sent by the terminal device. For example, there may be at least two different types of messages 3 in the random access process, namely, a first message 3 and a second message 3. Therefore, the terminal device may send two different types of messages 3, and the network device may respectively configure corresponding resources for sending different types of messages 3. For example, the first message 3 is a message 3 that does not carry user data, the first message 3 may also be referred to as a legacy message 3 (legacy Msg3), the second message 3 is a message 3 that carries the user data, and the second message 3 may also be referred to as an EDT Msg3. For example, the first message 3 may be a message 3 in normal transmission. For another example, the first message 3 may be a message 3 for which data transmission is not performed in advance. For example, the second message 3 is a message 3 for which data transmission is performed in advance. Data herein may be service data of the terminal device. For example, the network device allocates specific resources based on different messages 3 sent by the terminal device. For example, the network device may allocate, to the terminal device, a quantity of resource blocks (RB) used for the first message 3 and an index of a start resource block, or the network device may allocate, to the terminal device, a quantity of resource blocks used for the second message 3 and an index of a start resource block.

In this embodiment of this application, in addition to the scheduling information, the first downlink control information may further include indication information for the first data. The indication information is used to indicate that the first data transmitted by the terminal device is the first message 3 or the second message 3, and a bit length of the indication information is 1 bit.

In this embodiment of this application, a format of the first downlink control information is the same as that of second downlink control information, the second downlink control information includes scheduling information used by the terminal device to transmit second data, and the second data is data different from the first data. For example, the second data may be data transmitted when the terminal device is in connected mode, and the first data may be data transmitted by the terminal device when the terminal device is in idle mode in a random access process. In addition, the second downlink control information does not include the indication information, while the first downlink control information includes the indication information. Therefore, the indication information may indicate, to the terminal device, whether the message 3 that needs to be sent is the first message 3 or the second message 3. When different data needs to be scheduled, the network device may send different downlink control information. For example, the network device may choose to send the first downlink control information or send the second downlink control information.

202: The terminal device receives the first downlink control information.

The first downlink control information includes the scheduling information used by the terminal device to transmit the first data.

In some embodiments of this application, the format of the first downlink control information is a downlink control information DCI format 6-0A, or the format of the first downlink control information is a DCI format 6-0B.

203: The terminal device obtains the indication information in the first downlink control information.

The indication information is used to indicate that the first data transmitted by the terminal device is the first message 3 or the second message 3, and the bit length of the indication information is 1 bit. The format of the first downlink control information is the same as that of the second downlink control information, the second downlink control information includes the scheduling information used by the terminal device to transmit the second data, and the second downlink control information does not include the indication information.

In this embodiment of this application, if the first downlink control information sent by the network device includes the indication information, the terminal device may determine, by parsing the indication information, that the first data that the network device indicates the terminal device to transmit is the first message 3 or the second message 3. In this embodiment of this application, the second downlink control information includes the scheduling information used by the terminal device to transmit the second data, and the second data is data different from the first data. In addition, the second downlink control information does not include the indication information, while the first downlink control information includes the indication information. Therefore, the terminal device may obtain the indication information by receiving the first downlink control information, and determine, based on the indication information, whether to send the first message 3 or the second message 3.

204: The terminal device transmits the first data based on the scheduling information and the indication information.

In this embodiment of this application, the scheduling information in the first downlink control information indicates a scheduling mode of the first data, and the indication information in the first downlink control information indicates whether the first data that needs to be transmitted is the first message 3 or the second message 3. Therefore, the terminal device may transmit the first data by using the scheduling information and the indication information. For example, the terminal device transmits the first data through a wireless network. For example, if the indication information indicates that the first data is the first message 3, the terminal device may send the first message 3 based on the scheduling information that is received this time. If the indication information indicates that the first data is the second message 3, the terminal device may send the second message 3 based on the scheduling information that is received this time.

It should be noted that in this embodiment of this application, the indication information included in the first downlink control information may be included in the scheduling information, or may not be included in the scheduling information. This depends on an implementation scenario.

205: The network device receives the first data transmitted by the terminal device.

In this embodiment of this application, the terminal device transmits the first data based on the scheduling information and the indication information, and the network device may receive, based on the scheduling information, the first data sent by the terminal device. For example, if the indication information indicates that the first data is the first message 3, the terminal device may send the first message 3 based on the scheduling information that is received this time, and the network device may receive the first message 3 sent by the terminal device. If the indication information indicates that the first data is the second message 3, the terminal device may send the second message 3 based on the scheduling information that is received this time, and the network device may receive the second message 3 sent by the terminal device.

It can be learned from the example description of this application in the foregoing embodiment that, the terminal device receives the first downlink control information, the first downlink control information includes the scheduling information used by the terminal device to transmit the first data, and the second downlink control information includes the scheduling information used by the terminal device to transmit the second data. In addition, the first downlink control information includes the indication information, while the second downlink control information does not include the indication information, and the format of the first downlink control information is the same as that of the second downlink control information. The indication information in the first downlink control information may be used to indicate that the first data transmitted by the terminal device is the first message 3 or the second message 3. Therefore, in this embodiment of this application, in view of the first downlink control information transmitted each time, it may be determined, by using the indication information, that the transmitted first data is the first message 3 or the second message 3, and a quantity of transmissions does not need to reach a maximum quantity of HARQ retransmissions configured in a network. Therefore, it may be determined whether to fall back from transmitting the second message 3 to transmitting the first message 3, so that a fallback latency is reduced, and power consumption of the terminal device is reduced.

The following describes, from perspectives of a network device and a terminal device, the information transmission method provided in the embodiments of this application.

Figure 3:
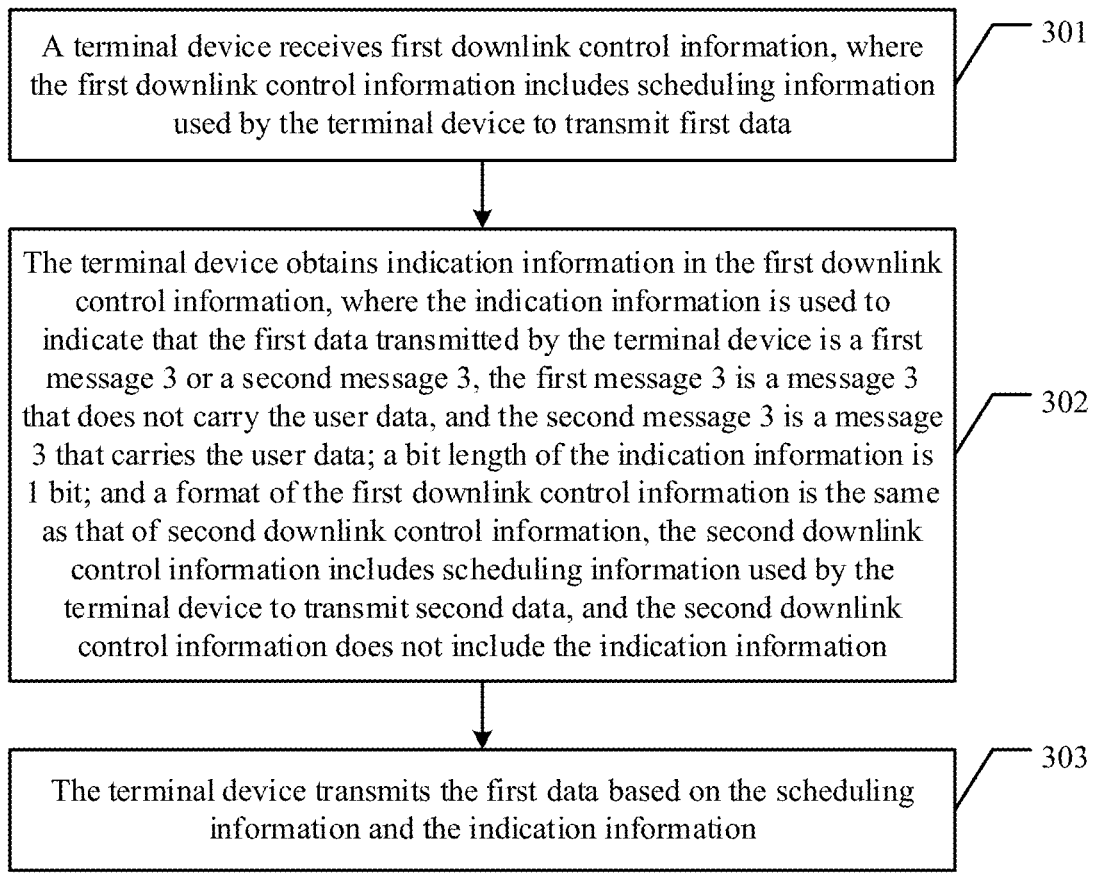
FIG. 3 is a schematic block flowchart of an information transmission method according to an embodiment of this application.

First, refer to FIG. 3. An embodiment of this application provides an information transmission method, including the following operations.

301: A terminal device receives first downlink control information, where the first downlink control information includes scheduling information used by the terminal device to transmit first data.

In this embodiment of this application, the terminal device first receives the first downlink control information sent by a network device. The first downlink control information includes the scheduling information, and the scheduling information may be used to schedule the first data to be transmitted by the terminal device. The first data is a message transmitted by the terminal device. A message 3 is a third message in a random access process, and the message 3 may carry user data. For example, the message 3 may support early data transmission. Corresponding resources may be respectively configured for a plurality of types of messages that can be sent by the terminal device. For example, there may be at least two different types of messages 3 in the random access process, namely, a first message 3 and a second message 3. Therefore, the terminal device may send two different types of messages 3, and the network device may respectively configure corresponding resources for sending different types of messages 3. For example, the first message 3 is a message 3 that does not carry user data, and the second message 3 is a message 3 that carries the user data. For example, the first message 3 may be a message 3 in normal transmission. For another example, the first message 3 may be a message 3 for which data transmission is not performed in advance. For example, the second message 3 is a message 3 for which data transmission is performed in advance. Data herein may be service data of the terminal device.

302: The terminal device obtains indication information in the first downlink control information, where the indication information is used to indicate that the first data transmitted by the terminal device is the first message 3 or the second message 3, the first message 3 is the message 3 that does not carry the user data, and the second message 3 is the message 3 that carries the user data; a bit length of the indication information is 1 bit; and a format of the first downlink control information is the same as that of second downlink control information, the second downlink control information includes scheduling information used by the terminal device to transmit second data, and the second downlink control information does not include the indication information.

In some embodiments of this application, the first message 3 may be a message 3 that carries the user data, the second message 3 may be a message 3 that carries the user data, a transport block size TBS used to transmit the first message 3 is a TBS used when the terminal device transmits an initial message 3, and a TBS used to transmit the second message 3 is a TBS configured by the network device. The network device may schedule, in retransmission scheduling, the terminal device to transmit, based on the TBS configured by the network device, the message 3 that carries the user data. Therefore, when receiving the message 3 that carries the user data, a base station does not need to perform blind detection, thereby reducing complexity of the network device.

In this embodiment of this application, in addition to the scheduling information, the first downlink control information may further include indication information for the first data. The indication information is used to indicate that the first data transmitted by the terminal device is the first message 3 or the second message 3, and a bit length of the indication information is 1 bit.

In some embodiments of this application, the terminal device is at a coverage enhancement level 0 or a coverage enhancement level 1, or in a coverage enhancement mode A; the first downlink control information further includes a first resource allocation field, and the first resource allocation field includes at least $$\left\lceil \log_2 \left\lfloor \frac{N_{RB}^{UL}}{6} \right\rfloor \right\rceil + 4 \text{ bits,}$$

where the $$\left\lceil \log_2 \left\lfloor \frac{N_{RB}^{UL}}{6} \right\rfloor \right\rceil$$

bits in the first resource allocation field indicate an index of a narrowband in an uplink bandwidth, and the 4 bits in the first resource allocation field indicate resource block allocation within the narrowband corresponding to the index of the narrowband; and the second downlink control information further includes a second resource allocation field, and the second resource allocation field includes at least $$\left\lceil \log_2 \left\lfloor \frac{N_{RB}^{UL}}{6} \right\rfloor \right\rceil + 5 \text{ bits,}$$

where the $$\left\lceil \log_2 \left\lfloor \frac{N_{RB}^{UL}}{6} \right\rfloor \right\rceil$$

bits in the second resource allocation field indicate an index of a narrowband in an uplink bandwidth, and the 5 bits in the second resource allocation field indicate resource block allocation within the narrowband corresponding to the index of the narrowband; and/or the first downlink control information further includes a first modulation and coding scheme field, a bit length of the first modulation and coding scheme field is H bits, the second downlink control information further includes a second modulation and coding scheme field, a bit length of the second modulation and coding scheme field is H+1 bits, and H is a positive integer greater than or equal to 1; and/or the first downlink control information does not include a channel state information (CSI) request field, and the second downlink control information includes the CSI request field; and/or the first downlink control information does not include a sounding reference signal (SRS) request field, and the second downlink control information includes the SRS request field.

The mode A or a mode B of the terminal device is a classification of coverage enhancement (CE) levels in connected mode, a CE level 0/1/2/3 is a coverage enhancement level in idle mode, the mode A corresponds to the CE level 0/1, and the mode B corresponds to the CE level 2/3.

In some embodiments of this application, when the terminal device is at the coverage enhancement level 0 or the coverage enhancement level 1, or in the coverage enhancement mode A, the first downlink control information further includes the first resource allocation field. For example, the first resource allocation field may be resource allocation in a DCI format 6-0A, the first resource allocation field includes at least the $$\left\lceil \log_2 \left\lfloor \frac{N_{RB}^{UL}}{6} \right\rfloor \right\rceil + 4 \text{ bits,}$$

$N_{RB}^{UL}$ indicates a quantity of uplink physical resource blocks (PRB) that are included in a system bandwidth, $\lfloor \ \rfloor$ indicates a rounding down operation, and $\lceil \ \rceil$ indicates a rounding up operation. The $$\left\lceil \log_2 \left\lfloor \frac{N_{RB}^{UL}}{6} \right\rfloor \right\rceil$$

bits in the first resource allocation field indicate the index of the narrowband in the uplink bandwidth, and the 4 bits in the first resource allocation field indicate the resource block allocation within the narrowband corresponding to the index of the narrowband.

The second downlink control information further includes the second resource allocation field, and the second resource allocation field includes at least the $$\left\lceil \log_2 \left\lfloor \frac{N_{RB}^{UL}}{6} \right\rfloor \right\rceil + 5 \text{ bits.}$$

The $$\left\lceil \log_2 \left\lfloor \frac{N_{RB}^{UL}}{6} \right\rfloor \right\rceil$$

bits in the second resource allocation field indicate the index of the narrowband in the uplink bandwidth, and the 5 bits in the second resource allocation field indicate the resource block allocation within the narrowband corresponding to the index of the narrowband.

Therefore, the first resource allocation field in the first downlink control information is 1 bit fewer than the second resource allocation field in the second downlink control information, the 1 bit is used for the indication information in the first downlink control information, and the first downlink control information and the second downlink control information have a same format. In this embodiment of this application, without additionally increasing overheads of the first downlink control information, the indication information in the first downlink control information supports fallback to the first message 3 in advance, so that a fallback latency is reduced, and power consumption of the terminal device is reduced.

In some embodiments of this application, the first downlink control information further includes the first modulation and coding scheme field. For example, the first modulation and coding scheme field is an MCS in the DCI format 6-0A, and a bit length of the first modulation and coding scheme field is H bits. The second downlink control information further includes the second modulation and coding scheme field, and a bit length of the second modulation and coding scheme field is H+1 bits. H is a positive integer greater than or equal to 1. For example, a value of H may be 3 bits, and a value of H+1 is 4 bits.

Therefore, the first modulation and coding scheme field in the first downlink control information is 1 bit fewer than the second modulation and coding scheme field in the second downlink control information, the 1 bit is used for the indication information in the first downlink control information, and the first downlink control information and the second downlink control information have a same format. In this embodiment of this application, without additionally increasing overheads of the first downlink control information, the indication information in the first downlink control information supports fallback to the first message 3 in advance, so that a fallback latency is reduced, and power consumption of the terminal device is reduced.

In some embodiments of this application, the first downlink control information does not include a CSI request field, and the second downlink control information includes the CSI request field. For example, the CSI request field may be a CSI request in the DCI format 6-0A. Therefore, compared with the second downlink control information, the first downlink control information does not include the CSI request field, the CSI request field that the first downlink control information does not include is used for the indication information in the first downlink control information, and the first downlink control information and the second downlink control information have a same format. In this embodiment of this application, without additionally increasing overheads of the first downlink control information, the indication information in the first downlink control information supports fallback to the first message 3 in advance, so that a fallback latency is reduced, and power consumption of the terminal device is reduced.

For example, when a base station schedules the second message 3 or the first message 3, the base station does not schedule UE to report CSI. Therefore, the first downlink control information may not include the CSI. The CSI request field in the DCI format 6-0A is used as the indication information, and the indication information may be used to indicate to send the second message 3, or fall back to sending the first message 3. For example, the indication information may be used to indicate to retransmit an EDT Msg3 or fall back to a legacy Msg3.

In some embodiments of this application, the first downlink control information does not include an SRS request field, and the second downlink control information includes the SRS request field. For example, the CSI request field may be an SRS request in the DCI format 6-0A. Therefore, compared with the second downlink control information, the first downlink control information does not include the SRS request field, the SRS request field that the first downlink control information does not include is used for the indication information in the first downlink control information, and the first downlink control information and the second downlink control information have a same format. In this embodiment of this application, without additionally increasing overheads of the first downlink control information, the indication information in the first downlink control information supports fallback to the first message 3 in advance, so that a fallback latency is reduced, and power consumption of the terminal device is reduced.

For example, when the base station schedules the EDT Msg3 or the legacy Msg 3, the base station does not schedule the UE to send an SRS. Therefore, the first downlink control information may not include the SRS, the SRS request field in the DCI format 6-0A is used as the indication information, and the SRS request field in the DCI format 6-0A is used to indicate retransmission of the EDT Msg3 or fallback to the legacy Msg3.

In some embodiments of this application, the terminal device is at a coverage enhancement level 2 or a coverage enhancement level 3, or in a coverage enhancement mode B; and the first downlink control information further includes a first modulation and coding scheme field, a bit length of the first modulation and coding scheme field is T bits, the second downlink control information further includes a second modulation and coding scheme field, a bit length of the second modulation and coding scheme field is T+1 bits, and T is a positive integer greater than or equal to 1. For example, a value of T may be 3 bits, and a value of T+1 may be 4 bits.

The first modulation and coding scheme field is an MCS in a DCI format 6-0B, the bit length of the first modulation and coding scheme field is T bits, the second downlink control information further includes the second modulation and coding scheme field, and the bit length of the second modulation and coding scheme field is T+1 bits.

Therefore, the first modulation and coding scheme field in the first downlink control information is 1 bit fewer than the second modulation and coding scheme field in the second downlink control information, the 1 bit is used for the indication information in the first downlink control information, and the first downlink control information and the second downlink control information have a same format. In this embodiment of this application, without additionally increasing overheads of the first downlink control information, the indication information in the first downlink control information supports fallback to the first message 3 in advance, so that a fallback latency is reduced, and power consumption of the terminal device is reduced.

In some embodiments of this application, the terminal device is at a coverage enhancement level 2 or a coverage enhancement level 3, or in a coverage enhancement mode B; and the first downlink control information further includes a first modulation and coding scheme field, the indication information is carried by the first modulation and coding scheme field, a bit length of the first modulation and coding scheme field is 4 bits, and when a bit state of the first modulation and coding scheme field is a state in 0000 to 1010, the first data transmitted by the terminal device is the first message 3, or when a bit state of the first modulation and coding scheme field is a state in 1011 to 1111, the first data transmitted by the terminal device is the second message 3.

The first modulation and coding scheme field is a modulation and coding scheme in a DCI format 6-0B, and has 4 bits. When the indication information in the first downlink control information is carried by the first modulation and coding scheme field, the bit length of the first modulation and coding scheme field is 4 bits, and the bit state of the first modulation and coding scheme field is a state in 0000 to 1010, a state in 0000 to 1010 may be used to indicate that the first data transmitted by the terminal device is the first message 3, and the bit state indicates the transport block size of the first message 3. When the bit state of the first modulation and coding scheme field is a state in 1011 to 1111, a state in 0000 to 1010 may be used to indicate that the first data transmitted by the terminal device is the second message 3. For example, a preset state 1111, a preset state 1110, or a preset state 1011 indicates that the first data transmitted by the terminal device is the second message 3.

In this embodiment of this application, the indication information in the first downlink control information is carried by the first modulation and coding scheme field, and the first downlink control information and the second downlink control information have a same format. In this embodiment of this application, without additionally increasing overheads of the first downlink control information, the indication information in the first downlink control information supports fallback to the first message 3 in advance, so that a fallback latency is reduced, and power consumption of the terminal device is reduced.

In some embodiments of this application, when a bit state of the indication information is a first bit state, the terminal device sends the second message 3 based on a first TBS, or when a bit state of the indication information is a second bit state, the terminal device sends the first message 3 or the terminal device sends the second message 3 based on a second TBS; or when a bit state of the indication information is a first bit state, the terminal device sends the second message 3 based on a second TBS, or when a bit state of the indication information is a second bit state, the terminal device sends the first message 3 or the terminal device sends the second message 3 based on a first TBS.

The first TBS is a TBS determined based on the second TBS, and the second TBS is a TBS configured by the network device.

That the first TBS is a TBS determined based on the second TBS may include the following process: In an EDT process, the network device configures a largest TBS, namely, the second TBS, for each coverage enhancement level/mode by using a system message. The network device may further enable the UE to select a preset TBS value that corresponds to the largest TBS and that is smaller than or equal to the largest TBS, that is, select the first TBS smaller than or equal to the second TBS. If the network device enables the UE to select the preset TBS value that corresponds to the largest TBS and that is smaller than or equal to the largest TBS, during decoding, the network device needs to blindly detect the TBS value used by the UE. If the network device does not enable the UE to select the TBS value that corresponds to the preset largest TBS and that is smaller than or equal to the largest TBS, the UE uses, as the first TBS, the largest TBS configured by the network device, and sends, based on the first TBS, the Msg3 including the user data.

For example, the second TBS may be a largest TBS configured by the network device, and the indication information may have two bit states: the first bit state and the second bit state. For example, the first bit state may be 0, and the second bit state may be 1. Alternatively, the first bit state may be 1, and the second bit state may be 0. The second message 3 carries the user data. When the bit state of the indication information is the first bit state, the terminal device sends the second message 3 based on the first TBS. For example, the first TBS is smaller than or equal to the largest transport block size configured by the network device. When the bit state of the indication information is the second bit state, the terminal device sends the first message 3 or the terminal device sends the second message 3 based on the second TBS. In other words, when the bit state of the indication information is the second bit state, the terminal device may fall back from transmitting the second message 3 to transmitting the first message 3, or may send the second message 3 based on the TBS (namely, the second TBS) configured by the network device. For example, when the bit state of the indication information is 1, it indicates that the first message 3 is transmitted, or when the bit state of the indication information is 0, it indicates that the second message 3 is transmitted. Different bit states of the indication information may be used to indicate the terminal whether to perform EDT fallback, to be specific, to fall back from the EDT Msg3 to the legacy Msg3, without requiring the terminal device to retransmit a random access preamble sequence that is used to indicate the legacy Msg3 after the terminal device performs a plurality of HARQ retransmissions, and the base station schedules the legacy Msg3 based on the transmitted random access preamble sequence, so that a fallback latency is reduced and power consumption of the terminal device is reduced.

Further, in some embodiments of this application, when the bit state of the indication information is the first bit state, a resource allocation field in the first downlink control information includes at least $$\left\lceil \log_2\left\lfloor \frac{N_{RB}^{UL}}{6} \right\rfloor \right\rceil + X \text{ bits,}$$

where the $$\left\lceil \log_2\left\lfloor \frac{N_{RB}^{UL}}{6} \right\rfloor \right\rceil$$

bits in the resource allocation field indicate an index of a narrowband in an uplink bandwidth, and the X bits in the resource allocation field indicate resource allocation within the narrowband; or when the bit state of the indication information is the second bit state, a resource allocation field in the first downlink control information includes at least $$\left\lceil \log_2\left\lfloor \frac{N_{RB}^{UL}}{6} \right\rfloor \right\rceil \text{ bits,}$$

where the $$\left\lceil \log_2\left\lfloor \frac{N_{RB}^{UL}}{6} \right\rfloor \right\rceil$$

bits in the resource allocation field indicate an index of a narrowband in an uplink bandwidth, the first downlink control information further includes Y bits, each of M×L states of the Y bits indicates that the first data transmitted by the terminal device is the first message 3, and each of the M×L states of the Y bits indicates a modulation and coding scheme and resource allocation within the narrowband, where there are a total of M resource allocation modes of the resource allocation within the narrowband, there are a total of L indexes of the modulation and coding scheme, M and L are positive integers, one or more other states than the M×L states of the Y bits indicate that the first data transmitted by the terminal device is the second message 3.

For example, when the terminal device is at the coverage enhancement level 0 or the coverage enhancement level 1, or in the coverage enhancement mode A, and the bit state of the indication information is 0, a length of the resource allocation field in the first downlink control information is $$\left\lceil \log_2 \left\lfloor \frac{N_{RB}^{UL}}{6} \right\rfloor \right\rceil + 5 \text{ bits.}$$

When the bit state of the indication information is 1, the first downlink control information includes 8 bits, the 8 bits indicate 256 states, and 252 states of the 256 states are used to indicate combinations of the modulation and coding scheme and the resource allocation within the narrowband. There are 21 states of the resource allocation within the narrowband, and there are a total of 12 index values including K to (K+10) and M for the coding scheme. When the bit state indicates that the index value of the modulation and coding scheme is one value in K to (K+10), the terminal device transmits the first message 3, or when the index value of the modulation and coding scheme is M, the terminal device transmits the second message 3. K and M are integers. For example, K is 0, and M is 11.

It should be noted that, in this embodiment of this application, states of the MCS in the prior art are limited from 16 to 12, and the 21 states of the resource allocation within the narrowband are still maintained. In this case, there are 12×21=252 states, and 8 bits are required for joint coding by using the MCS and the resource allocation. Compared with 4 bits of the MCS in the prior art, 5 bits are for the resource allocation within the narrowband. In other words, there are a total of 9 bits in the prior art. In this embodiment of this application, only 8 bits are required after the MCS and the resource allocation are jointly encoded. Therefore, 1 bit can be saved. The 1 bit that is saved is used as the indication information. For example, the indication information may be a flag. If the flag is 0, it indicates EDT retransmission, and a TBS size for the retransmission is adaptively selected by the UE. If the flag is 1 and the indicated index value of the MCS is a predefined value A, it indicates EDT retransmission, and a retransmitted TBS is a largest TBS configured by the network device. If the flag is 1 and index values of the MCS that are indicated are 11 values other than the value A in the 12 values of the MCS, it indicates that the EDT Msg3 falls back to the legacy Msg3. In this case, the transport block size of the legacy Msg3 is determined based on the indicated index value of the MCS.

For example, when the terminal device is at the coverage enhancement level 2 or the coverage enhancement level 3, or in the coverage enhancement mode B, and the bit state of the indication information is 0, a length of the resource allocation field in the first downlink control information is $$\left\lceil \log_2 \left\lfloor \frac{N_{RB}^{UL}}{6} \right\rfloor \right\rceil + 3 \text{ bits.}$$

When the bit state of the indication information is 1, the first downlink control information includes 6 bits, the 6 bits indicate 64 states, and the 64 states are used to indicate combinations of the modulation and coding scheme and the resource allocation within the narrowband. There are 8 states of the resource allocation within the narrowband, and there are a total of 8 index values including Q to (Q+6) and S for the coding scheme. When the index value of the modulation and coding scheme is one value in Q to (Q+6), the terminal device transmits the first message 3, or when the index value of the modulation and coding scheme is S, the terminal device transmits the second message 3. Q and S are integers. For example, Q=0, and S=7.

It should be noted that, in this embodiment of this application, existing states of the MCS may be limited from 11 to 8, and the 8 states of the resource allocation within the narrowband are still maintained. In this case, there are 8×8=64 states, and 6 bits are required for joint coding by using the MCS and the resource allocation. Compared with the existing 4 bits that are needed for the MCS value, 3 bits are needed for the resource allocation within the narrowband, and 1 bit is saved in this embodiment of this application. The 1 bit that is saved is used as the indication information. For example, the indication information may be a flag. If the flag is 0, it indicates EDT retransmission, and a TBS size for the retransmission is adaptively selected by the UE. If the flag is 1 and the indicated index value of the MCS is a predefined value B, it indicates EDT retransmission, and a retransmitted TBS is a largest TBS configured by the network device. If the flag is 1 and index values of the MCS that are indicated are the other 7 values in the 8 values of the MCS, it indicates that the EDT Msg3 falls back to the legacy Msg3. In this case, the transport block size of the legacy Msg3 is determined based on the index value of the MCS.

303: The terminal device transmits the first data based on the scheduling information and the indication information.

In this embodiment of this application, the scheduling information in the first downlink control information indicates a scheduling mode of the first data, and the indication information in the first downlink control information indicates whether the first data that needs to be transmitted is the first message 3 or the second message 3. Therefore, the terminal device may transmit the first data by using the scheduling information and the indication information. For example, the terminal device transmits the first data through a wireless network. For example, if the indication information indicates that the first data is the first message 3, the terminal device may send the first message 3 based on the scheduling information that is received this time. If the indication information indicates that the first data is the second message 3, the terminal device may send the second message 3 based on the scheduling information that is received this time.

It can be learned from the example description of this application in the foregoing embodiment that, the terminal device receives the first downlink control information, the first downlink control information includes the scheduling information used by the terminal device to transmit the first data, and the second downlink control information includes the scheduling information used by the terminal device to transmit the second data. In addition, the first downlink control information includes the indication information, while the second downlink control information does not include the indication information, and the format of the first downlink control information is the same as that of the second downlink control information. The indication information in the first downlink control information may be used to indicate that the first data transmitted by the terminal device is the first message 3 or the second message 3. Therefore, in this embodiment of this application, in view of the first downlink control information transmitted each time, it may be determined, by using the indication information, that the transmitted first data is the first message 3 or the second message 3, and a quantity of transmissions does not need to reach a maximum quantity of HARQ retransmissions configured in a network. Therefore, it may be determined whether to fall back from transmitting the second message 3 to transmitting the first message 3, so that a fallback latency is reduced, and power consumption of the terminal device is reduced.

Figure 4:
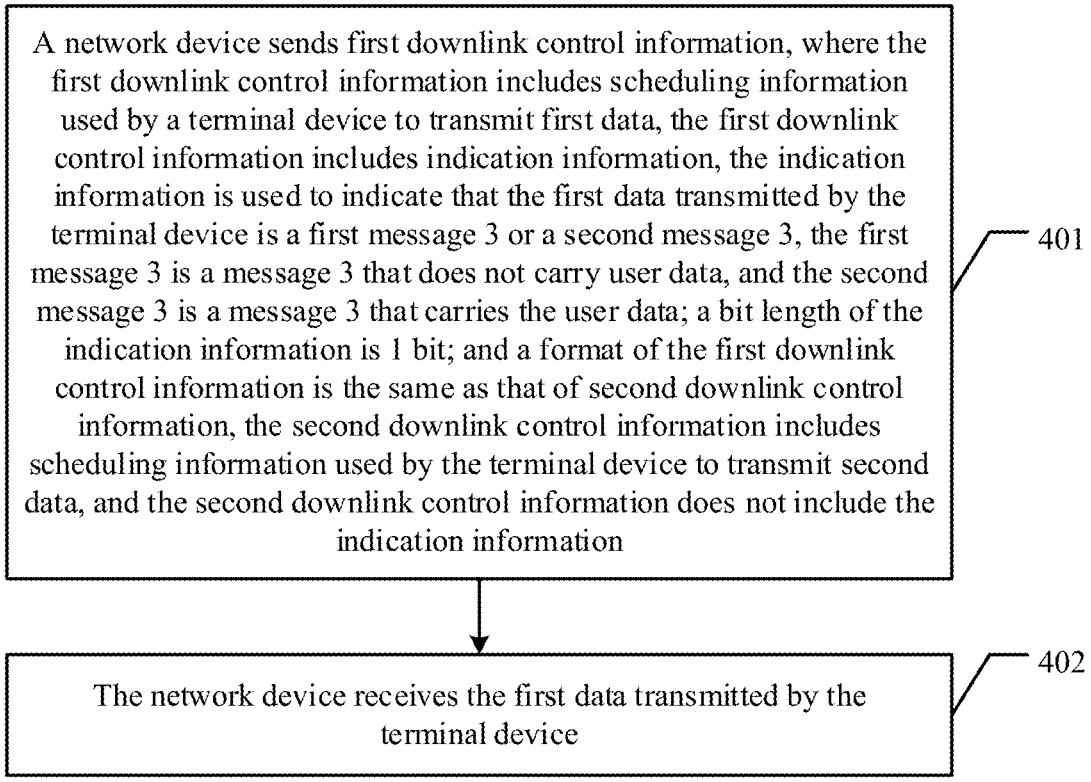
FIG. 4 is a schematic block flowchart of another information transmission method according to an embodiment of this application.

The foregoing embodiment describes, from the perspective of the terminal device, the information transmission method provided in the embodiments of this application. The following describes, from a perspective of a network device, the information transmission method provided in the embodiments of this application. Referring to FIG. 4, an embodiment of this application provides an information transmission method, including the following operations.

401: A network device sends first downlink control information, where the first downlink control information includes scheduling information used by a terminal device to transmit first data, the first downlink control information includes indication information, the indication information is used to indicate that the first data transmitted by the terminal device is a first message 3 or a second message 3, the first message 3 is the message 3 that does not carry user data, and the second message 3 is the message 3 that carries the user data; a bit length of the indication information is 1 bit; and a format of the first downlink control information is the same as that of second downlink control information, the second downlink control information includes scheduling information used by the terminal device to transmit second data, and the second downlink control information does not include the indication information.

In this embodiment of this application, in addition to the scheduling information, the first downlink control information may further include indication information for the first data. The indication information is used to indicate that the first data transmitted by the terminal device is the first message 3 or the second message 3, and a bit length of the indication information is 1 bit.

In some embodiments of this application, the first message 3 may be a message 3 that carries the user data, the second message 3 may be a message 3 that carries the user data, a transport block size TBS used to transmit the first message 3 is a TBS used when the terminal device transmits an initial message 3, and a TBS used to transmit the second message 3 is a TBS configured by the network device. The network device may schedule, in retransmission scheduling, the terminal device to transmit, based on the TBS configured by the network device, the message 3 that carries the user data. Therefore, when receiving the message 3 that carries the user data, a base station does not need to perform blind detection, thereby reducing complexity of the network device.

In some embodiments of this application, the terminal device is at a coverage enhancement level 0 or a coverage enhancement level 1, or in a coverage enhancement mode A; the first downlink control information further includes a first resource allocation field, and the first resource allocation field includes at least $$\left\lceil \log_2 \left\lfloor \frac{N_{RB}^{UL}}{6} \right\rfloor \right\rceil + 4 \text{ bits,}$$

where the $$\left\lceil \log_2 \left\lfloor \frac{N_{RB}^{UL}}{6} \right\rfloor \right\rceil$$

bits in the first resource allocation field indicate an index of a narrowband in an uplink bandwidth, and the 4 bits in the first resource allocation field indicate resource block allocation within the narrowband corresponding to the index of the narrowband; and the second downlink control information further includes a second resource allocation field, and the second resource allocation field includes at least $$\left\lceil \log_2 \left\lfloor \frac{N_{RB}^{UL}}{6} \right\rfloor \right\rceil + 5 \text{ bits,}$$

where the $$\left\lceil \log_2 \left\lfloor \frac{N_{RB}^{UL}}{6} \right\rfloor \right\rceil$$

bits in the second resource allocation field indicate an index of a narrowband in an uplink bandwidth, and the 5 bits in the second resource allocation field indicate resource block allocation within the narrowband corresponding to the index of the narrowband; and/or the first downlink control information further includes a first modulation and coding scheme field, a bit length of the first modulation and coding scheme field is H bits, the second downlink control information further includes a second modulation and coding scheme field, a bit length of the second modulation and coding scheme field is H+1 bits, and H is a positive integer greater than or equal to 1, for example, a value of H may be 3 bits, and a value of H+1 may be 4 bits; and/or the first downlink control information does not include a channel state information (CSI) request field, and the second downlink control information includes the CSI request field; and/or the first downlink control information does not include a sounding reference signal (Sounding Reference Signal, SRS) request field, and the second downlink control information includes the SRS request field.

The mode A or a mode B of the terminal device is a classification of coverage enhancement (CE) levels in connected mode, a CE level 0/1/2/3 is a coverage enhancement level in idle mode, the mode A corresponds to the CE level 0/1, and the mode B corresponds to the CE level 2/3.

In some embodiments of this application, when the terminal device is at the coverage enhancement level 0 or the coverage enhancement level 1, or in the coverage enhancement mode A, the first downlink control information further includes the first resource allocation field. For example, the first resource allocation field may be resource allocation in a DCI format 6-0A, the first resource allocation field includes at least the $$\left\lceil \log_2 \left\lfloor \frac{N_{RB}^{UL}}{6} \right\rfloor \right\rceil + 4 \text{ bits,}$$

$N_{RB}^{UL}$ indicates a quantity of uplink physical resource blocks (PRB) that are included in a system bandwidth, $\lfloor \ \rfloor$ indicates a rounding down operation, and $\lceil \ \rceil$ indicates a rounding up operation. The $$\left\lceil \log_2 \left\lfloor \frac{N_{RB}^{UL}}{6} \right\rfloor \right\rceil$$

bits in the first resource allocation field indicate the index of the narrowband in the uplink bandwidth, and the 4 bits in the first resource allocation field indicate the resource block allocation within the narrowband corresponding to the index of the narrowband.

The second downlink control information further includes the second resource allocation field, and the second resource allocation field includes at least the $$\left\lceil \log_2 \left\lfloor \frac{N_{RB}^{UL}}{6} \right\rfloor \right\rceil + 5 \text{ bits.}$$

The $$\left\lceil \log_2 \left\lfloor \frac{N_{RB}^{UL}}{6} \right\rfloor \right\rceil$$

bits in the second resource allocation field indicate the index of the narrowband in the uplink bandwidth, and the 5 bits in the second resource allocation field indicate the resource block allocation within the narrowband corresponding to the index of the narrowband.

Therefore, the first resource allocation field in the first downlink control information is 1 bit fewer than the second resource allocation field in the second downlink control information, the 1 bit is used for the indication information in the first downlink control information, and the first downlink control information and the second downlink control information have a same format. In this embodiment of this application, without additionally increasing overheads of the first downlink control information, the indication information in the first downlink control information supports fallback to the first message 3 in advance, so that a fallback latency is reduced, and power consumption of the terminal device is reduced.

In some embodiments of this application, the first downlink control information further includes the first modulation and coding scheme field. For example, the first modulation and coding scheme field is an MCS in the DCI format 6-0A, and a bit length of the first modulation and coding scheme field is H bits. The second downlink control information further includes the second modulation and coding scheme field, and a bit length of the second modulation and coding scheme field is H+1 bits. H is a positive integer greater than or equal to 1.

Therefore, the first modulation and coding scheme field in the first downlink control information is 1 bit fewer than the second modulation and coding scheme field in the second downlink control information, the 1 bit is used for the indication information in the first downlink control information, and the first downlink control information and the second downlink control information have a same format. In this embodiment of this application, without additionally increasing overheads of the first downlink control information, the indication information in the first downlink control information supports fallback to the first message 3 in advance, so that a fallback latency is reduced, and power consumption of the terminal device is reduced.

In some embodiments of this application, the first downlink control information does not include a CSI request field, and the second downlink control information includes the CSI request field. For example, the CSI request field may be a CSI request in the DCI format 6-0A. Therefore, compared with the second downlink control information, the first downlink control information does not include the CSI request field, the CSI request field that the first downlink control information does not include is used for the indication information in the first downlink control information, and the first downlink control information and the second downlink control information have a same format. In this embodiment of this application, without additionally increasing overheads of the first downlink control information, the indication information in the first downlink control information supports fallback to the first message 3 in advance, so that a fallback latency is reduced, and power consumption of the terminal device is reduced.

For example, when a base station schedules the second message 3 or the first message 3, the base station does not schedule UE to report CSI. Therefore, the first downlink control information may not include the CSI. The CSI request field in the DCI format 6-0A is used as the indication information, and the indication information may be used to indicate to send the second message 3, or fall back to sending the first message 3. For example, the indication information may be used to indicate to retransmit an EDT Msg3 or fall back to a legacy Msg3.

In some embodiments of this application, the first downlink control information does not include an SRS request field, and the second downlink control information includes the SRS request field. For example, the CSI request field may be an SRS request in the DCI format 6-0A. Therefore, compared with the second downlink control information, the first downlink control information does not include the SRS request field, the SRS request field that the first downlink control information does not include is used for the indication information in the first downlink control information, and the first downlink control information and the second downlink control information have a same format. In this embodiment of this application, without additionally increasing overheads of the first downlink control information, the indication information in the first downlink control information supports fallback to the first message 3 in advance, so that a fallback latency is reduced, and power consumption of the terminal device is reduced.

For example, when the base station schedules the EDT Msg3 or the legacy Msg 3, the base station does not schedule the UE to send an SRS. Therefore, the first downlink control information may not include the SRS, the SRS request field in the DCI format 6-0A is used as the indication information, and the SRS request field in the DCI format 6-0A is used to indicate retransmission of the EDT Msg3 or fallback to the legacy Msg3.

In some embodiments of this application, the terminal device is at a coverage enhancement level 2 or a coverage enhancement level 3, or in a coverage enhancement mode B; and the first downlink control information further includes a first modulation and coding scheme field, a bit length of the first modulation and coding scheme field is T bits, the second downlink control information further includes a second modulation and coding scheme field, a bit length of the second modulation and coding scheme field is T+1 bits, and T is a positive integer greater than or equal to 1. For example, a value of T may be 3 bits, and a value of T+1 may be 4 bits.

The first modulation and coding scheme field is an MCS in a DCI format 6-0B, the bit length of the first modulation and coding scheme field is T bits, the second downlink control information further includes the second modulation and coding scheme field, and the bit length of the second modulation and coding scheme field is T+1 bits.

Therefore, the first modulation and coding scheme field in the first downlink control information is 1 bit fewer than the second modulation and coding scheme field in the second downlink control information, the 1 bit is used for the indication information in the first downlink control information, and the first downlink control information and the second downlink control information have a same format. In this embodiment of this application, without additionally increasing overheads of the first downlink control information, the indication information in the first downlink control information supports fallback to the first message 3 in advance, so that a fallback latency is reduced, and power consumption of the terminal device is reduced.

In some embodiments of this application, the terminal device is at a coverage enhancement level 2 or a coverage enhancement level 3, or in a coverage enhancement mode B; and the first downlink control information further includes a first modulation and coding scheme field, the indication information is carried by the first modulation and coding scheme field, a bit length of the first modulation and coding scheme field is 4 bits, and when a bit state of the first modulation and coding scheme field is a state in 0000 to 1010, the first data transmitted by the terminal device is the first message 3, or when a bit state of the first modulation and coding scheme field is a state in 1011 to 1111, the first data transmitted by the terminal device is the second message 3.

The first modulation and coding scheme field is a modulation and coding scheme in a DCI format 6-0B, and has 4 bits. When the indication information in the first downlink control information is carried by the first modulation and coding scheme field, the bit length of the first modulation and coding scheme field is 4 bits, and the bit state of the first modulation and coding scheme field is a state in 0000 to 1010, a state in 0000 to 1010 may be used to indicate that the first data transmitted by the terminal device is the first message 3, and the bit state indicates the transport block size of the first message 3. When the bit state of the first modulation and coding scheme field is a state in 1011 to 1111, a state in 0000 to 1010 may be used to indicate that the first data transmitted by the terminal device is the second message 3. For example, a preset state 1111, a preset state 1110, or a preset state 1011 indicates that the first data transmitted by the terminal device is the second message 3.

In this embodiment of this application, the indication information in the first downlink control information is carried by the first modulation and coding scheme field, and the first downlink control information and the second downlink control information have a same format. In this embodiment of this application, without additionally increasing overheads of the first downlink control information, the indication information in the first downlink control information supports fallback to the first message 3 in advance, so that a fallback latency is reduced, and power consumption of the terminal device is reduced.

In some embodiments of this application, when a bit state of the indication information is a first bit state, the terminal device sends the second message 3 based on a first TBS, or when a bit state of the indication information is a second bit state, the terminal device sends the first message 3 or the terminal device sends the second message 3 based on a second TBS; or when a bit state of the indication information is a first bit state, the terminal device sends the second message 3 based on a second TBS, or when a bit state of the indication information is a second bit state, the terminal device sends the first message 3 or the terminal device sends the second message 3 based on a first TBS.

The first TBS is a TBS determined based on the second TBS, and the second TBS is a TBS configured by the network device.

That the first TBS is a TBS determined based on the second TBS may include the following process: In an EDT process, the network device configures a largest TBS, namely, the second TBS, for each coverage enhancement level/mode by using a system message. The network device may further enable the UE to select a preset TBS value that corresponds to the largest TBS and that is smaller than or equal to the largest TBS, that is, select the first TBS smaller than or equal to the second TBS. If the network device enables the UE to select the preset TBS value that corresponds to the largest TBS and that is smaller than or equal to the largest TBS, during decoding, the network device needs to blindly detect the TBS value used by the UE. If the network device does not enable the UE to select the TBS value that corresponds to the preset largest TBS and that is smaller than or equal to the largest TBS, the UE uses, as the first TBS, the largest TBS configured by the network device, and sends, based on the first TBS, the Msg3 including the user data.

For example, the second TBS may be a largest TBS configured by the network device, and the indication information may have two bit states: the first bit state and the second bit state. For example, the first bit state may be 0, and the second bit state may be 1. Alternatively, the first bit state may be 1, and the second bit state may be 0. The second message 3 carries the user data. When the bit state of the indication information is the first bit state, the terminal device sends the second message 3 based on the first TBS. For example, the first TBS is smaller than or equal to the largest transport block size configured by the network device. When the bit state of the indication information is the second bit state, the terminal device sends the first message 3 or the terminal device sends the second message 3 based on the second TBS. In other words, when the bit state of the indication information is the second bit state, the terminal device may fall back from transmitting the second message 3 to transmitting the first message 3, or may send the second message 3 based on the TBS (namely, the second TBS) configured by the network device. For example, when the bit state of the indication information is 1, it indicates that the first message 3 is transmitted, or when the bit state of the indication information is 0, it indicates that the second message 3 is transmitted. Different bit states of the indication information may be used to indicate the terminal whether to perform EDT fallback, to be specific, to fall back from the EDT Msg3 to the legacy Msg3, without requiring the terminal device to retransmit a random access preamble sequence that is used to indicate the legacy Msg3 after the terminal device performs a plurality of HARQ retransmissions, and the base station schedules the legacy Msg3 based on the transmitted random access preamble sequence, so that a fallback latency is reduced and power consumption of the terminal device is reduced.

Further, in some embodiments of this application, when the bit state of the indication information is the first bit state, a resource allocation field in the first downlink control information includes at least $$\left\lceil \log_2 \left\lfloor \frac{N_{RB}^{UL}}{6} \right\rfloor \right\rceil + X \text{ bits,}$$

where the $$\left\lceil \log_2 \left\lfloor \frac{N_{RB}^{UL}}{6} \right\rfloor \right\rceil$$

bits in the resource allocation field indicate an index of a narrowband in an uplink bandwidth, and the X bits in the resource allocation field indicate resource allocation within the narrowband; or when the bit state of the indication information is the second bit state, a resource allocation field in the first downlink control information includes at least $$\left\lceil \log_2 \left\lfloor \frac{N_{RB}^{UL}}{6} \right\rfloor \right\rceil \text{ bits,}$$

where the $$\left\lceil \log_2 \left\lfloor \frac{N_{RB}^{UL}}{6} \right\rfloor \right\rceil$$

bits in the resource allocation field indicate an index of a narrowband in an uplink bandwidth, the first downlink control information further includes Y bits, each of M×L states of the Y bits indicates that the first data transmitted by the terminal device is the first message 3, and each of the M×L states of the Y bits indicates a modulation and coding scheme and resource allocation within a narrowband, where there are a total of M resource allocation modes of the resource allocation within the narrowband, there are a total of L indexes of the modulation and coding scheme, M and L are positive integers, one or more other states than the M×L states of the Y bits indicate that the first data transmitted by the terminal device is the second message 3.

For example, when the terminal device is at the coverage enhancement level 0 or the coverage enhancement level 1, or in the coverage enhancement mode A, and the bit state of the indication information is 0, a length of the resource allocation field in the first downlink control information is $$\left\lceil \log_2 \left\lfloor \frac{N_{RB}^{UL}}{6} \right\rfloor \right\rceil + 5 \text{ bits.}$$

When the bit state of the indication information is 1, the first downlink control information includes 8 bits, the 8 bits indicate 256 states, and 252 states of the 256 states are used to indicate combinations of the modulation and coding scheme and the resource allocation within the narrowband. There are 21 states of the resource allocation within the narrowband, and there are a total of 12 index values including K to (K+10) and M for the coding scheme. When the bit state indicates that the index value of the modulation and coding scheme is one value in K to (K+10), the terminal device transmits the first message 3, or when the index value of the modulation and coding scheme is M, the terminal device transmits the second message 3. K and M are integers. For example, K is 0, and M is 11.

It should be noted that, in this embodiment of this application, states of the MCS in the prior art are limited from 16 to 12, and the 21 states of the resource allocation within the narrowband are still maintained. In this case, there are 12×21=252 states, and 8 bits are required for joint coding by using the MCS and the resource allocation. Compared with 4 bits of the MCS in the prior art, 5 bits are for the resource allocation within the narrowband. In other words, there are a total of 9 bits in the prior art. In this embodiment of this application, only 8 bits are required after the MCS and the resource allocation are jointly encoded. Therefore, 1 bit can be saved. The 1 bit that is saved is used as the indication information. For example, the indication information may be a flag. If the flag is 0, it indicates EDT retransmission, and a TBS size for the retransmission is adaptively selected by the UE. If the flag is 1 and the indicated index value of the MCS is a predefined value A, it indicates EDT retransmission, and a retransmitted TBS is a largest TBS configured by the network device. If the flag is 1 and index values of the MCS that are indicated are 11 values other than the value A in the 12 values of the MCS, it indicates that the EDT Msg3 falls back to the legacy Msg3. In this case, the transport block size of the legacy Msg3 is determined based on the indicated index value of the MCS.

For example, when the terminal device is at the coverage enhancement level 2 or the coverage enhancement level 3, or in the coverage enhancement mode B, and the bit state of the indication information is 0, a length of the resource allocation field in the first downlink control information is $$\left\lceil \log_2 \left\lfloor \frac{N_{RB}^{UL}}{6} \right\rfloor \right\rceil + 3 \text{ bits.}$$

When the bit state of the indication information is 1, the first downlink control information includes 6 bits, the 6 bits indicate 64 states, and the 64 states are used to indicate combinations of the modulation and coding scheme and the resource allocation within the narrowband. There are 8 states of the resource allocation within the narrowband, and there are a total of 8 index values including Q to (Q+6) and S for the coding scheme. When the index value of the modulation and coding scheme is one value in Q to (Q+6), the terminal device transmits the first message 3, or when the index value of the modulation and coding scheme is S, the terminal device transmits the second message 3. Q and S are integers. For example, Q=0, and S=7.

It should be noted that, in this embodiment of this application, existing states of the MCS may be limited from 11 to 8, and the 8 states of the resource allocation within the narrowband are still maintained. In this case, there are 8×8=64 states, and 6 bits are required for joint coding by using the MCS and the resource allocation. Compared with the existing 4 bits that are needed for the MCS value, 3 bits are needed for the resource allocation within the narrowband, and 1 bit is saved in this embodiment of this application. The 1 bit that is saved is used as the indication information. For example, the indication information may be a flag. If the flag is 0, it indicates EDT retransmission, and a TBS size for the retransmission is adaptively selected by the UE. If the flag is 1 and the indicated index value of the MCS is a predefined value B, it indicates EDT retransmission, and a retransmitted TBS is a largest TBS configured by the network device. If the flag is 1 and index values of the MCS that are indicated are the other 7 values in the 8 values of the MCS, it indicates that the EDT Msg3 falls back to the legacy Msg3. In this case, the transport block size of the legacy Msg3 is determined based on the index value of the MCS.

402: The network device receives the first data transmitted by the terminal device.

In this embodiment of this application, the terminal device transmits the first data based on the scheduling information and the indication information, and the network device may receive, based on the scheduling information, the first data sent by the terminal device. For example, if the indication information indicates that the first data is the first message 3, the terminal device may send the first message 3 based on the scheduling information that is received this time, and the network device may receive the first message 3 sent by the terminal device. If the indication information indicates that the first data is the second message 3, the terminal device may send the second message 3 based on the scheduling information that is received this time, and the network device may receive the second message 3 sent by the terminal device.

It can be learned from the example description of this application in the foregoing embodiment that, the terminal device receives the first downlink control information, the first downlink control information includes the scheduling information used by the terminal device to transmit the first data, and the second downlink control information includes the scheduling information used by the terminal device to transmit the second data. In addition, the first downlink control information includes the indication information, while the second downlink control information does not include the indication information, and the format of the first downlink control information is the same as that of the second downlink control information. The indication information in the first downlink control information may be used to indicate that the first data transmitted by the terminal device is the first message 3 or the second message 3. Therefore, in this embodiment of this application, in view of the first downlink control information transmitted each time, it may be determined, by using the indication information, that the transmitted first data is the first message 3 or the second message 3, and a quantity of transmissions does not need to reach a maximum quantity of HARQ retransmissions configured in a network. Therefore, it may be determined whether to fall back from transmitting the second message 3 to transmitting the first message 3, so that a fallback latency is reduced, and power consumption of the terminal device is reduced.

Figure 5:
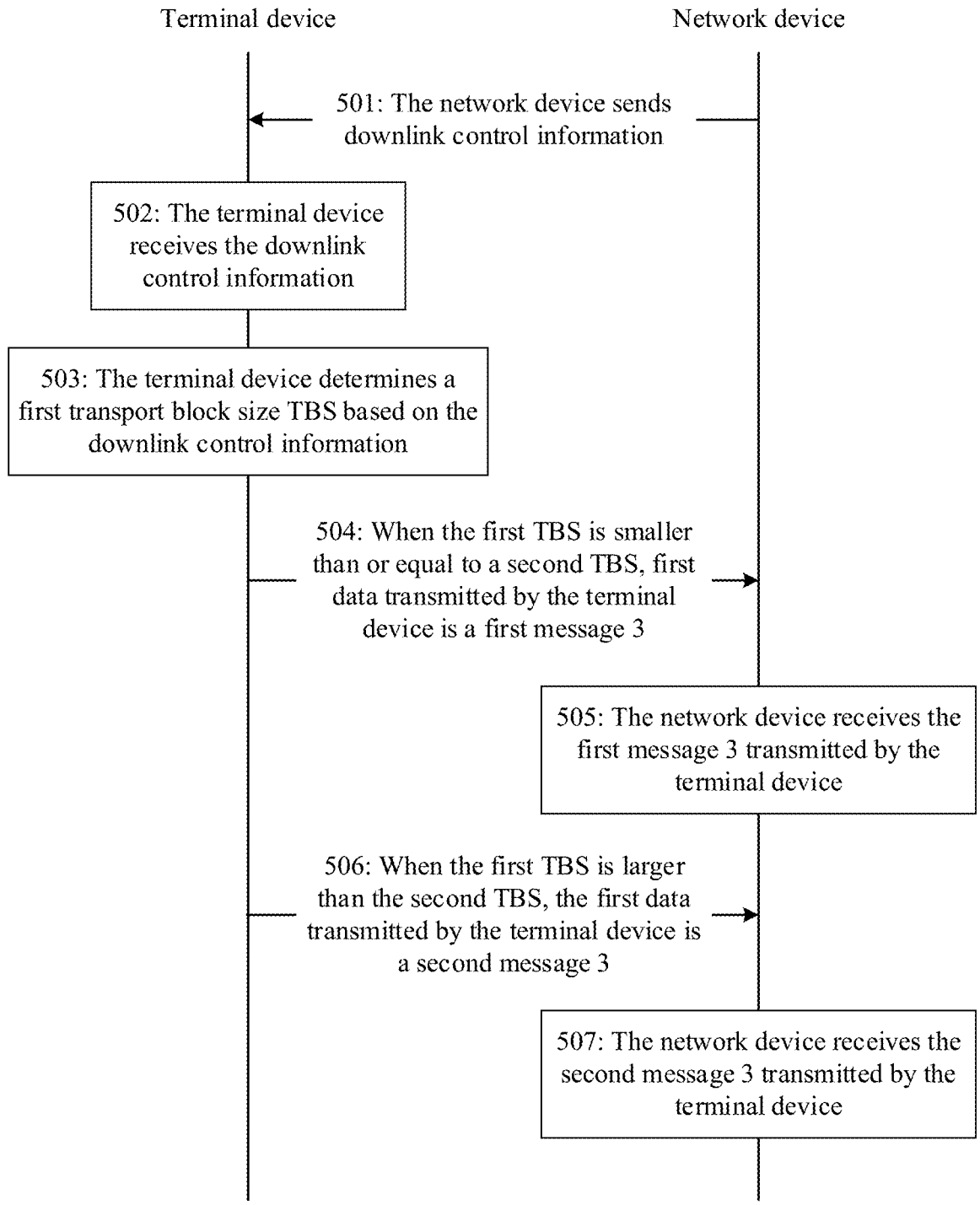
FIG. 5 is another schematic flowchart of interaction between a terminal device and a network device according to an embodiment of this application.

The foregoing embodiments describes the information transmission method provided in the embodiments of this application. Referring to FIG. 5, another information transmission method implemented through interaction between a terminal device and a network device according to an embodiment of this application includes the following operations.

501: A network device sends downlink control information, where the downlink control information includes scheduling information used by the terminal device to transmit first data.

In this embodiment of this application, the network device sends the downlink control information. The downlink control information includes the scheduling information, and the scheduling information may be used to schedule the first data to be transmitted by the terminal device. The first data is a message transmitted by the terminal device. A message 3 is a third message in a random access process, and the message 3 may carry user data. For example, the message 3 may support early data transmission. Corresponding resources may be respectively configured for a plurality of types of messages that can be sent by the terminal device. For example, there may be at least two different types of messages 3 in the random access process, namely, a first message 3 and a second message 3. Therefore, the terminal device may send two different types of messages 3, and the network device may respectively configure corresponding resources for sending different types of messages 3. For example, the first message 3 is a message 3 that does not carry user data, and the second message 3 is a message 3 that carries the user data. For example, the first message 3 may be a message 3 in normal transmission. For another example, the first message 3 may be a message 3 for which data transmission is not performed in advance. For example, the second message 3 is a message 3 for which data transmission is performed in advance. Data herein may be service data of the terminal device.

502: The terminal device receives the downlink control information, where the downlink control information includes the scheduling information used by the terminal device to transmit the first data.

In this embodiment of this application, the terminal device first receives the downlink control information sent by the network device. The downlink control information includes the scheduling information, and the scheduling information may be used to schedule the first data to be transmitted by the terminal device. The first data is a message transmitted by the terminal device. A message 3 is a third message in a random access process, and the message 3 may carry user data. For example, the message 3 may support early data transmission. Corresponding resources may be respectively configured for a plurality of types of messages that can be sent by the terminal device. For example, there may be at least two different types of messages 3 in the random access process, namely, a first message 3 and a second message 3. Therefore, the terminal device may send two different types of messages 3, and the network device may respectively configure corresponding resources for sending different types of messages 3. For example, the first message 3 is a message 3 that does not carry user data, and the second message 3 is a message 3 that carries the user data. For example, the first message 3 may be a message 3 in normal transmission. For another example, the first message 3 may be a message 3 for which data transmission is not performed in advance. For example, the second message 3 is a message 3 for which data transmission is performed in advance. Data herein may be service data of the terminal device.

503: The terminal device determines a first transport block size TBS based on the downlink control information, where when the first TBS is smaller than or equal to a second TBS, operation 504 and operation 505 are triggered, or when the first TBS is larger than a second TBS, operation 506 and operation 507 are triggered.

504: When the first TBS is smaller than or equal to the second TBS, the first data transmitted by the terminal device is the first message 3.

505: The network device receives the first message 3 transmitted by the terminal device.

506: When the first TBS is larger than the second TBS, the first data transmitted by the terminal device is the second message 3.

507: The network device receives the second message 3 transmitted by the terminal device.

The second TBS is a preset transport block size, or a transport block size configured by using system information, or a transport block size configured by using radio resource control signaling.

In this embodiment of this application, the terminal device determines the first transport block size based on the downlink control information. The terminal device sends the first message 3 when the first TBS is smaller than or equal to the second TBS, or sends the second message 3 when the first TBS is larger than the second TBS. The second TBS is a preset transport block size, a transport block size broadcast in a system message, or a transport block size broadcast in a mobility control message. For example, the network device may indicate, to the terminal device in an implicit indication manner, that a type of the first data is the first message 3 or the second message 3. For example, the network device may indicate the type of the first data by using a transport block size (TBS), and determine the type of the first data based on the first TBS configured by the network device in DCI and the preset second TBS. The second TBS may be the TBS that is broadcast in the system message or the mobility control message sent by the network device, or the second TBS may be a preset TBS. If the first TBS is smaller than or equal to the second TBS, the terminal device falls back to a legacy Msg3. Otherwise, EDT Msg3 is transmitted.

Therefore, in this embodiment of this application, the TBS carried in the downlink control information may be used to determine whether the transmitted first data is the first message 3 or the second message 3, and a quantity of transmissions does not need to reach a maximum quantity of HARQ retransmissions configured in a network. Therefore, it may be determined whether to fall back from transmitting the second message 3 to transmitting the first message 3, so that a fallback latency is reduced, and power consumption of the terminal device is reduced.

For better understanding and implementation of the foregoing solution of the embodiment of the present invention, the following provides detailed description by using a corresponding application scenario as an example.

In the prior art, when the quantity of HARQ retransmissions of the Msg3 reaches the maximum quantity, if a base station still cannot perform decoding successfully, UE needs to return to the first operation, that is, retransmit a preamble sequence. According to an existing standard, if the UE intends to fall back to transmitting the legacy Msg3, the UE can reselect, only after the quantity of the retransmissions reaches the maximum quantity of the HARQ retransmissions, a PRACH resource used to indicate the legacy Msg3, to perform legacy random access. In the existing standard, when the UE falls back from the EDT Msg3 to the legacy Msg 3, the maximum quantity of the HARQ retransmissions needs to be reached. Consequently, a latency is large, and power consumption is high.

In this embodiment of this application, when the UE transmits the EDT Msg3 unsuccessfully or the initial access load is relatively heavy, a DCI format 6-0A/B is used to indicate, when the quantity of the transmissions performed by the UE does not reach the maximum quantity of the HARQ retransmissions configured by the network, the EDT Msg3 to fall back to transmitting the legacy Msg3, in this way, a fallback latency is reduced, and power consumption of the UE is reduced.

In this embodiment of this application, the following solutions are used:

1. The lowest/highest bit in 5 low bits of the resource allocation in the DCI format 6-0A is used to indicate the fallback of mode A EDT Msg3 to the legacy Msg3.

2. A newly added bit used to indicate sub-PRB resource allocation is used to indicate EDT fallback.

3. A preset MCS state is used to indicate the EDT fallback, and the mode B uses an unused state.

4. The fallback is implicitly indicated based on a comparison between a TBS configured by the network in DCI and a TBS that is preset or broadcast in a system message/mobility control message.

A network element involved in the embodiments of the present invention includes a base station and UE. The base station is an entity configured to send or receive a signal on a network side. The UE may be any terminal. For example, the UE is user equipment for machine type communication.

First, an example in which the terminal device is in the mode A is used.

In an embodiment, during initial transmission scheduling of the EDT Msg3/legacy Msg3, only $$\left\lceil \log_2 \left\lfloor \frac{N_{RB}^{UL}}{6} \right\rfloor \right\rceil + 4 \text{ bits are used, where } \left\lceil \log_2 \left\lfloor \frac{N_{RB}^{UL}}{6} \right\rfloor \right\rceil$$

high bits indicate an index of a narrowband in a system bandwidth. For the initial transmission scheduling of the legacy Msg3, 4 low bits indicate scheduling of 1, 2, 3, or 6 PRBs within the narrowband. For the initial transmission scheduling of the EDT Msg3, the 4 low bits indicate scheduling of 2, 3, 4, 5, or 6 PRBs within the narrowband. Therefore, a remaining 1 bit in the resource allocation field is not used.

Therefore, the lowest/highest bit in the 5 low bits of the $$\left\lceil \log_2 \left\lfloor \frac{N_{RB}^{UL}}{6} \right\rfloor \right\rceil + 5$$

bits of the resource allocation field in the DCI format 6-0A is used to indicate whether the EDT fallback is performed. For example, if the lowest/highest bit is 0, it indicates retransmission of the EDT Msg3, and in this case, the DCI is retransmission scheduling information of the EDT Msg3; or if the lowest/highest bit is 1, it indicates fallback to the legacy Msg3, and in this case, DCI is scheduling information of the legacy Msg3.

In another embodiment, according to an existing standard, during initial transmission scheduling of the legacy Msg3 in an MAC RAR, an MCS range is from 0 to 7. During scheduling of the EDT Msg3, an MCS does not need to be indicated (where a largest TBS is configured in a network, the UE uses the largest TBS or selects a TBS from a preset set corresponding to the largest TBS, to send the EDT Msg3, and the base station blindly detects the TBS when receiving the EDT Msg3). Therefore, the preset MCS state is used to indicate the EDT fallback. MCS indexes 0 to 7 indicate fallback, and MCS indexes 8 to 15 indicate EDT retransmission scheduling.

In another embodiment, based on a comparison between a TBS configured by the network device in DCI and a TBS that is preset or broadcast in a system message/mobility control message, if the TBS is smaller than or equal to the TBS that is preset or broadcast in the system message/mobility control message, the terminal device falls back to the legacy Msg3; otherwise, the EDT Msg3 is transmitted.

In another embodiment, to support sub-PRB resource allocation, 2 or 3 bits are newly added to the resource allocation field. Therefore, the newly added bits used to indicate the sub-PRB resource allocation may be used to indicate whether the EDT fallback is performed.

In another embodiment, when the base station schedules the EDT Msg3 or the legacy Msg 3, the base station does not schedule the UE to report channel state information (CSI). A CSI field in the DCI format 6-0A is used to indicate retransmission of the EDT Msg3 or fallback to the legacy Msg3.

In another embodiment, when the base station schedules the EDT Msg3 or the legacy Msg 3, the base station does not schedule the UE to send a sounding reference signal (SRS). An SRS request field in the DCI format 6-0A is used to indicate retransmission of the EDT Msg3 or fallback to the legacy Msg3.

In another embodiment, existing states of the MCS are limited from 16 to 12, and the 21 states of the resource allocation within the narrowband are still maintained. In this case, there are 12×21=252 states, and 8 bits are required for joint coding by using the MCS and the resource allocation. Compared with the existing 4 bits of the MCS, 5 bits are for the resource allocation within the narrowband, and 1 bit is saved. The 1 bit that is saved is used as a flag. If the flag is 0, it indicates EDT retransmission, and a TBS size for the retransmission is adaptively selected by the UE. If the flag is 1 and the indicated index value of the MCS is a predefined value A, it indicates EDT retransmission, and a retransmitted TBS is a largest TBS configured by the network device. If the flag is 1 and index values of the MCS that are indicated are the other 11 values in the 12 values of the MCS, it indicates that the EDT Msg3 falls back to the legacy Msg3. In this case, the transport block size of the legacy Msg3 is determined based on the index value of the MCS.

It can be learned from the foregoing example description that a memory in the base station and a memory on a UE side need to store a preset state of the MCS used to indicate fallback. The base station and the UE side need to perform the comparison and decision processes in Embodiments 1 to 3. This supports fallback to the legacy Msg3 in advance without additionally increasing DCI overheads, thereby reducing a latency and power consumption.

The following uses an example in which the terminal device is in the mode B.

In an embodiment, because the MCS supports only states 0 to 10, in an existing standard, there are 5 MCS states unused, and one or more of the 5 unused MCS states are used to indicate the EDT fallback.

In another embodiment, based on a comparison between a TBS configured by the network device in DCI and a TBS that is preset or broadcast in a system message/mobility control message, if the TBS is smaller than or equal to the TBS that is preset or broadcast in the system message/mobility control message, the terminal device falls back to the legacy Msg3; otherwise, the EDT Msg3 is transmitted.

In another embodiment, to support sub-PRB resource allocation, 2 or 3 bits are newly added to the resource allocation field. Therefore, the newly added bits used to indicate the sub-PRB resource allocation may be used to indicate whether the EDT fallback is performed.

In another embodiment, existing states of the MCS are limited from 11 to 8, and 8 states of the resource allocation within the narrowband are still maintained. In this case, there are 8×8=64 states, and 6 bits are required for joint coding by using the MCS and the resource allocation. Compared with the existing 4 bits of the MCS, 3 bits are for the resource allocation within the narrowband, and 1 bit is saved. The 1 bit that is saved is used as a flag. If the flag is 0, it indicates EDT retransmission, and a TBS size for the retransmission is adaptively selected by the UE. If the flag is 1 and the indicated index value of the MCS is a predefined value B, it indicates EDT retransmission, and a retransmitted TBS is a largest TBS configured by the network device. If the flag is 1 and index values of the MCS that are indicated are the other 7 values in the 8 values of the MCS, it indicates that the EDT Msg3 falls back to the legacy Msg3. In this case, the transport block size of the legacy Msg3 is determined based on the index value of the MCS.

It can be learned from the foregoing example description that a memory in a base station and a memory on a UE side need to store the state of the MCS used to indicate the fallback. The base station and the UE side need to perform the comparison and the decision processes. This supports fallback to the legacy Msg3 in advance without additionally increasing DCI overheads, thereby reducing a latency and power consumption.

It should be noted that, to make the description brief, the method embodiments are expressed as a series of actions. However, a person skilled in the art should appreciate that the present invention is not limited to the described action sequence, because according to the present invention, some operations may be performed in other sequences or performed simultaneously. In addition, a person skilled in the art should also appreciate that all the embodiments described in the specification are used as examples, and the related actions and modules are not necessarily mandatory to the present invention.

The following further provides related apparatuses configured to implement the foregoing solutions, to better implement the foregoing solutions in the embodiments of this application.

Figure 6:
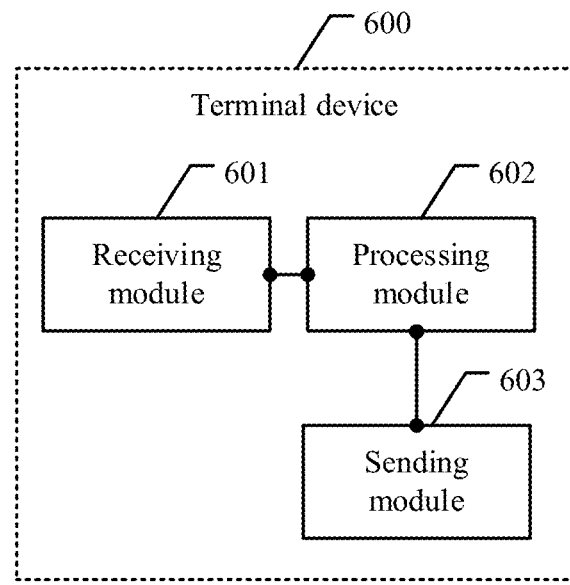
FIG. 6 is a schematic structural composition diagram of a terminal device according to an embodiment of this application.

An embodiment of this application provides a terminal device. As shown in FIG. 6, a terminal device 600 includes:

a receiving module 601, configured to receive first downlink control information, where the first downlink control information includes scheduling information used by the terminal device to transmit first data;

a processing module 602, configured to obtain indication information in the first downlink control information, where the indication information is used to indicate that the first data transmitted by the terminal device is a first message 3 or a second message 3, where the first message 3 is a message 3 that does not carry user data, and the second message 3 is a message 3 that carries the user data; or the first message 3 is a message 3 that carries user data, and the second message 3 is a message 3 that carries the user data, in this case, a transport block size TBS used to transmit the first message 3 is a TBS used when the communications device transmits an initial message 3, and a TBS used to transmit the second message 3 is a TBS configured by a network device; and a bit length of the indication information is 1 bit; and a format of the first downlink control information is the same as that of second downlink control information, the second downlink control information includes scheduling information used by the terminal device to transmit second data, and the second downlink control information does not include the indication information; and a sending module 603, configured to transmit the first data based on the scheduling information and the indication information.

Figure 7:
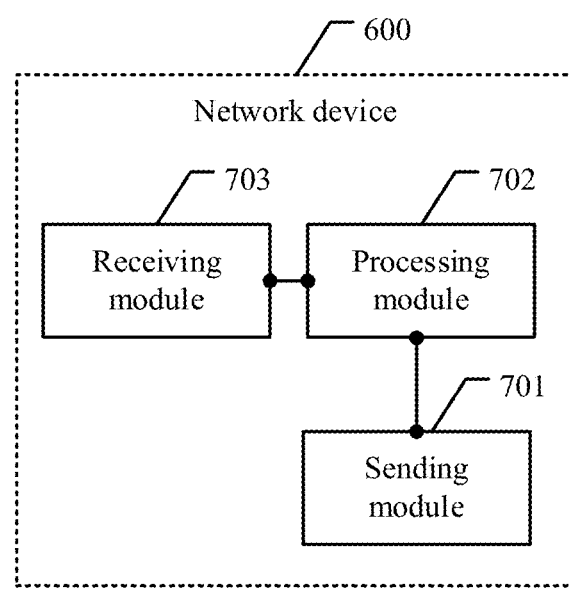
FIG. 7 is a schematic structural composition diagram of a network device according to an embodiment of this application.

An embodiment of this application provides a network device. As shown in FIG. 7, the network device 700 includes:

a processing module 702, configured to send first downlink control information by using a sending module 701, where the first downlink control information includes scheduling information used by a terminal device to transmit first data; and the first downlink control information includes indication information, and the indication information is used to indicate that the first data transmitted by the terminal device is a first message 3 or a second message 3, where the first message 3 is a message 3 that does not carry user data, and the second message 3 is a message 3 that carries the user data; or the first message 3 is a message 3 that carries user data, and the second message 3 is a message 3 that carries the user data, in this case, a transport block size TBS used to transmit the first message 3 is a TBS used when the communications device transmits an initial message 3, and a TBS used to transmit the second message 3 is a TBS configured by the network device; and a bit length of the indication information is 1 bit; and a format of the first downlink control information is the same as that of second downlink control information, the second downlink control information includes scheduling information used by the terminal device to transmit second data, and the second downlink control information does not include the indication information; and the processing module 702 is configured to receive, by using the receiving module 703, the first data transmitted by the terminal device.

In some embodiments of this application, the terminal device is at a coverage enhancement level 0 or a coverage enhancement level 1, or in a coverage enhancement mode A;

the first downlink control information further includes a first resource allocation field, and the first resource allocation field includes at least $$\left\lceil \log_2 \left\lfloor \frac{N_{RB}^{UL}}{6} \right\rfloor \right\rceil + 4 \text{ bits,}$$

where the $$\left\lceil \log_2 \left\lfloor \frac{N_{RB}^{UL}}{6} \right\rfloor \right\rceil$$

bits in the first resource allocation field indicate an index of a narrowband in an uplink bandwidth, and the 4 bits in the first resource allocation field indicate resource block allocation within the narrowband corresponding to the index of the narrowband; and the second downlink control information further includes a second resource allocation field, and the second resource allocation field includes at least $$\left\lceil \log_2 \left\lfloor \frac{N_{RB}^{UL}}{6} \right\rfloor \right\rceil + 5 \text{ bits,}$$

where the $$\left\lceil \log_2 \left\lfloor \frac{N_{RB}^{UL}}{6} \right\rfloor \right\rceil$$

bits in the second resource allocation field indicate an index of a narrowband in an uplink bandwidth, and the 5 bits in the second resource allocation field indicate resource block allocation within the narrowband corresponding to the index of the narrowband; and/or the first downlink control information further includes a first modulation and coding scheme field, a bit length of the first modulation and coding scheme field is H bits, the second downlink control information further includes a second modulation and coding scheme field, a bit length of the second modulation and coding scheme field is H+1 bits, and H is a positive integer greater than or equal to 1; and/or the first downlink control information does not include a channel state information CSI request field, and the second downlink control information includes the CSI request field; and/or the first downlink control information does not include a sounding reference signal SRS request field, and the second downlink control information includes the SRS request field.

In some embodiments of this application, the terminal device is at a coverage enhancement level 2 or a coverage enhancement level 3, or in a coverage enhancement mode B;

the first downlink control information further includes a first modulation and coding scheme field, a bit length of the first modulation and coding scheme field is T bits, the second downlink control information further includes a second modulation and coding scheme field, a bit length of the second modulation and coding scheme field is T+1 bits, and T is a positive integer greater than or equal to 1.

In some embodiments of this application, the terminal device is at a coverage enhancement level 2 or a coverage enhancement level 3, or in a coverage enhancement mode B;

the first downlink control information further includes a first modulation and coding scheme field, the indication information is carried by the first modulation and coding scheme field, a bit length of the first modulation and coding scheme field is 4 bits, and when a bit state of the first modulation and coding scheme field is a state in 0000 to 1010, the first data transmitted by the terminal device is the first message 3, or when a bit state of the first modulation and coding scheme field is a state in 1011 to 1111, the first data transmitted by the terminal device is the second message 3.

In some embodiments of this application, when a bit state of the indication information is a first bit state, the terminal device sends the second message 3 based on a first TBS, or when a bit state of the indication information is a second bit state, the terminal device sends the first message 3 or the terminal device sends the second message 3 based on a second TBS; or when a bit state of the indication information is a first bit state, the terminal device sends the second message 3 based on a second TBS, or when a bit state of the indication information is a second bit state, the terminal device sends the first message 3 or the terminal device sends the second message 3 based on a first TBS, where the first TBS is a TBS determined based on the second TBS, and the second TBS is a TBS configured by the network device.

In some embodiments of this application, when the bit state of the indication information is the first bit state, a resource allocation field in the first downlink control information includes at least $$\left\lceil \log_2 \left\lfloor \frac{N_{RB}^{UL}}{6} \right\rfloor \right\rceil + X \text{ bits,}$$

where the $$\left\lceil \log_2 \left\lfloor \frac{N_{RB}^{UL}}{6} \right\rfloor \right\rceil$$

bits in the resource allocation field indicate an index of a narrowband in an uplink bandwidth, and the X bits in the resource allocation field indicate resource allocation within the narrowband; or when the bit state of the indication information is the second bit state, a resource allocation field in the first downlink control information includes at least $$\left\lceil \log_2 \left\lfloor \frac{N_{RB}^{UL}}{6} \right\rfloor \right\rceil \text{ bits,}$$

where the $$\left\lceil \log_2 \left\lfloor \frac{N_{RB}^{UL}}{6} \right\rfloor \right\rceil$$

bits in the resource allocation field indicate an index of a narrowband in an uplink bandwidth, the first downlink control information further includes Y bits, each of M×L states of the Y bits indicates that the first data transmitted by the terminal device is the first message 3, and each of the M×L states of the Y bits indicates a modulation and coding scheme and resource allocation within the narrowband, where there are a total of M resource allocation modes of the resource allocation within the narrowband, there are a total of L indexes of the modulation and coding scheme, M and L are positive integers, one or more other states than the M×L states of the Y bits indicate that the first data transmitted by the terminal device is the second message 3.

In some embodiments of this application, the format of the first downlink control information is a downlink control information DCI format 6-0A; or the format of the first downlink control information is a DCI format 6-0B.

It can be learned from the example description of this application in the foregoing embodiment that, the terminal device receives the first downlink control information, the first downlink control information includes the scheduling information used by the terminal device to transmit the first data, and the second downlink control information includes the scheduling information used by the terminal device to transmit the second data. In addition, the first downlink control information includes the indication information, while the second downlink control information does not include the indication information, and the format of the first downlink control information is the same as that of the second downlink control information. The indication information in the first downlink control information may be used to indicate that the first data transmitted by the terminal device is the first message 3 or the second message 3. Therefore, in this embodiment of this application, in view of the first downlink control information transmitted each time, it may be determined, by using the indication information, that the transmitted first data is the first message 3 or the second message 3, and a quantity of transmissions does not need to reach a maximum quantity of HARQ retransmissions configured in a network. Therefore, it may be determined whether to fall back from transmitting the second message 3 to transmitting the first message 3, so that a fallback latency is reduced, and power consumption of the terminal device is reduced.

An embodiment of this application further provides a network device, including a sending module and a receiving module.

The sending module is configured to send downlink control information. The downlink control information includes scheduling information used by the terminal device to transmit first data.

In this embodiment of this application, the network device sends the downlink control information. The downlink control information includes the scheduling information, and the scheduling information may be used to schedule the first data to be transmitted by the terminal device. The first data is a message transmitted by the terminal device. A message 3 is a third message in a random access process, and the message 3 may carry user data. For example, the message 3 may support early data transmission. Corresponding resources may be respectively configured for a plurality of types of messages that can be sent by the terminal device. For example, there may be at least two different types of messages 3 in the random access process, namely, a first message 3 and a second message 3. Therefore, the terminal device may send two different types of messages 3, and the network device may respectively configure corresponding resources for sending different types of messages 3. For example, the first message 3 is a message 3 that does not carry user data, and the second message 3 is a message 3 that carries the user data. For example, the first message 3 may be a message 3 in normal transmission. For another example, the first message 3 may be a message 3 for which data transmission is not performed in advance. For example, the second message 3 is a message 3 for which data transmission is performed in advance. Data herein may be service data of the terminal device. Alternatively, the first message 3 is a message 3 that carries the user data, the second message 3 is a message 3 that carries the user data, a transport block size TBS used to transmit the first message 3 is a TBS used when the communications device transmits an initial message 3, and a TBS used to transmit the second message 3 is a TBS configured by the network device.

The receiving module is configured to: when the first TBS is smaller than or equal to the second TBS, receive the first message 3 transmitted by the terminal device; or when the first TBS is larger than the second TBS, receive the second message 3 transmitted by the terminal device.

The second TBS is a preset transport block size, or a transport block size configured by using system information, or a transport block size configured by using radio resource control signaling.

An embodiment of this application further provides a terminal device, including a receiving module, a processing module, and a sending module.

The receiving module is configured to receive downlink control information, where the downlink control information includes scheduling information used by the terminal device to transmit first data.

In this embodiment of this application, the terminal device first receives the downlink control information sent by the network device. The downlink control information includes the scheduling information, and the scheduling information may be used to schedule the first data to be transmitted by the terminal device. The first data is a message transmitted by the terminal device. A message 3 is a third message in a random access process, and the message 3 may carry user data. For example, the message 3 may support early data transmission. Corresponding resources may be respectively configured for a plurality of types of messages that can be sent by the terminal device. For example, there may be at least two different types of messages 3 in the random access process, namely, a first message 3 and a second message 3. Therefore, the terminal device may send two different types of messages 3, and the network device may respectively configure corresponding resources for sending different types of messages 3. For example, the first message 3 is a message 3 that does not carry user data, and the second message 3 is a message 3 that carries the user data. For example, the first message 3 may be a message 3 in normal transmission. For another example, the first message 3 may be a message 3 for which data transmission is not performed in advance. For example, the second message 3 is a message 3 for which data transmission is performed in advance. Data herein may be service data of the terminal device. Alternatively, the first message 3 is a message 3 that carries the user data, the second message 3 is a message 3 that carries the user data, a transport block size TBS used to transmit the first message 3 is a TBS used when the communications device transmits an initial message 3, and a TBS used to transmit the second message 3 is a TBS configured by the network device.

The processing module is configured to determine a first transport block size TBS based on the downlink control information.

The sending module is configured to transmit the first data when the first TBS is smaller than or equal to a second TBS, where the first data is the first message 3. When the first TBS is larger than the second TBS, the transmitted first data is the second message 3.

The second TBS is a preset transport block size, or a transport block size configured by using system information, or a transport block size configured by using radio resource control signaling.

It should be noted that content such as information exchange between the modules/units of the apparatus and the execution processes thereof is based on the same idea as the method embodiments of the present invention, and produces the same technical effects as the method embodiments of the present invention. For the specific content, reference may be made to the foregoing description in the method embodiments of the present invention, and details are not described herein again.

An embodiment of this application further provides a computer storage medium. The computer storage medium stores a program, and the program is executed to perform some or all of the operations described in the foregoing method embodiments.

Figure 8:
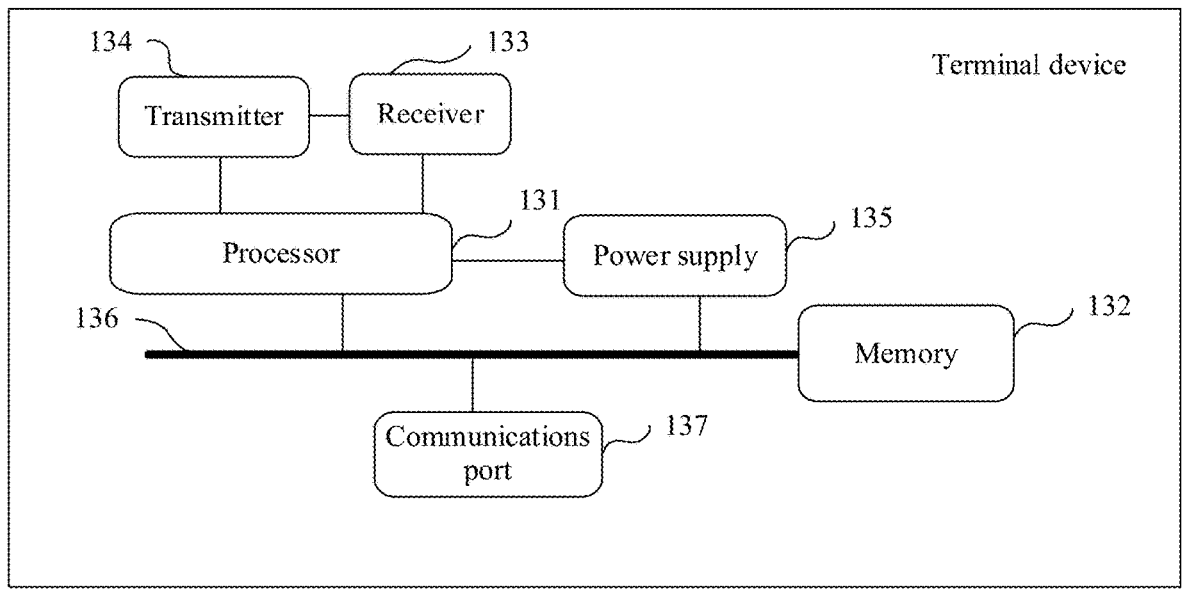
FIG. 8 is a schematic structural composition diagram of another terminal device according to an embodiment of this application.

FIG. 8 is a schematic structural diagram of another device according to an embodiment of this application. The device is a terminal device, and the terminal device may include a processor 131 (for example, a CPU), a memory 132, a transmitter 134, and a receiver 133. The transmitter 134 and the receiver 133 are coupled to the processor 131, and the processor 131 controls a sending action of the transmitter 134 and a receiving action of the receiver 133. The memory 132 may include a high-speed RAM memory, and may further include a nonvolatile memory NVM, for example, at least one magnetic disk memory. The memory 132 may store various instructions, to complete various processing functions and implement the method operations in the embodiments of this application. Optionally, the terminal device in this embodiment of this application may further include one or more of a power supply 135, a communications bus 136, and a communications port 137. The receiver 133 and the transmitter 134 may be integrated into a transceiver of the terminal device, or may be a receive antenna and a transmit antenna that are independent of each other on the terminal device. The communications bus 136 is configured to implement communication connections between the components. The communications port 137 is configured to implement connection and communication between the terminal device and another peripheral.

In this embodiment of this application, the memory 132 is configured to store computer-executable program code, and the program code includes an instruction. When the processor 131 executes the instruction, the instruction enables the processor 131 to perform a processing action of the terminal device in the foregoing method embodiments, and enables the transmitter 134 to perform a sending action of the terminal device in the foregoing method embodiments. Their implementation principles and technical effects are similar. Details are not described herein again.

Figure 9:
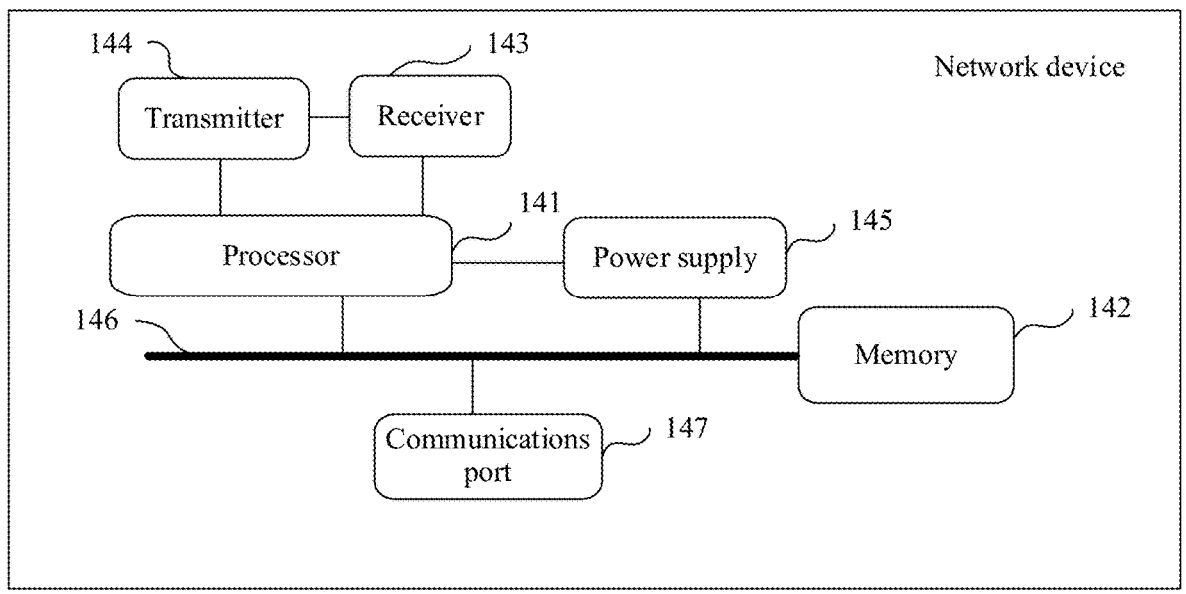
FIG. 9 is a schematic structural composition diagram of another network device according to an embodiment of this application.

FIG. 9 is a schematic structural diagram of another device according to an embodiment of this application. The device is a network device, and the network device may include a processor 141 (for example, a CPU), a memory 142, a receiver 143, and a transmitter 144. The receiver 143 and the transmitter 144 are coupled to the processor 141, and the processor 141 controls a receiving action of the receiver 143 and a sending action of the transmitter 144. The memory 142 may include a high-speed RAM memory, and may further include a nonvolatile memory NVM, for example, at least one magnetic disk memory. The memory 142 may store various instructions, to complete various processing functions and implement the method operations in the embodiments of this application. Optionally, the network device in this embodiment of this application may further include one or more of a power supply 145, a communications bus 146, and a communications port 147. The receiver 143 and the transmitter 144 may be integrated into a transceiver of the network device, or may be a receive antenna and a transmit antenna that are independent of each other on the network device. The communications bus 146 is configured to implement communication connections between the components. The communications port 147 is configured to implement connection and communication between the network device and another peripheral.

In this embodiment of this application, the memory 142 is configured to store computer-executable program code, and the program code includes an instruction. When the processor 141 executes the instruction, the instruction enables the processor 141 to perform a processing action of the network device in the foregoing method embodiments, and enables the transmitter 144 to perform a sending action of the network device in the foregoing method embodiments. Their implementation principles and technical effects are similar. Details are not described herein again.

In another possible design, when the apparatus is a chip in a terminal, the chip includes a processing unit and a communications unit. The processing unit may be, for example, a processor. The communications unit may be, for example, an input/output interface, a pin, or a circuit. The processing unit may execute a computer-executable instruction stored in a storage unit, to enable the chip in the terminal to perform the wireless communication method according to any design of the first aspect. Optionally, the storage unit may be a storage unit in the chip, such as a register or a buffer, or the storage unit may be a storage unit in the terminal but outside the chip, such as a read-only memory (ROM), another type of static storage device capable of storing static information and instructions, or a random access memory (RAM).

The processor mentioned anywhere above may be a general-purpose central processing unit (CPU), a microprocessor, an application-specific integrated circuit (ASIC), or one or more integrated circuits for controlling program execution of the wireless communication method according to the first aspect.

In addition, it should be noted that the apparatus embodiments described above are merely examples. The units described as separate parts may or may not be physically separate, and parts displayed as units may or may not be physical units, may be located in one position, or may be distributed on a plurality of network units. Some or all of the modules may be selected based on actual requirements to achieve the objectives of the solutions of the embodiments. In addition, in the accompanying drawings of the apparatus embodiments provided in this application, connection relationships between modules indicate that the modules have communication connections with each other, which may be specifically implemented as one or more communications buses or signal cables. A person of ordinary skill in the art may understand and implement the embodiments of the present invention without creative efforts.

Based on the descriptions of the foregoing implementations, a person skilled in the art may clearly understand that this application may be implemented by software in addition to necessary universal hardware, or by special-purpose hardware, including a dedicated integrated circuit, a dedicated CPU, a dedicated memory, a dedicated component, and the like. Generally, any functions that can be performed by a computer program can be easily implemented by corresponding hardware. Moreover, a specific hardware structure used to achieve a same function may be of various forms, for example, in a form of an analog circuit, a digital circuit, a dedicated circuit. However, as for this application, a software program implementation is a better implementation in most cases. Based on such an understanding, the technical solutions of this application essentially or the part contributing to the prior art may be implemented in a form of a software product. The computer software product is stored in a readable storage medium, such as a floppy disk, a USB flash drive, a removable hard disk, a read-only memory (ROM), a random access memory (RAM), a magnetic disk, or a compact disc of a computer, and includes several instructions for instructing a computer device (which may be a personal computer, a server, a network device, or the like) to perform the methods described in the embodiments of this application.

All or some of the foregoing embodiments may be implemented through software, hardware, firmware, or any combination thereof. When software is used to implement the embodiments, the embodiments may be implemented all or partially in a form of a computer program product.

The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

What is claimed is:

1. An information transmission method, comprising:
receiving, by a communications device, first downlink control information (DCI) in a DCI format 6-0B, wherein the first DCI comprises scheduling information, indication information, and a first modulation and coding scheme field, wherein the indication information is carried by the first modulation and coding scheme field, wherein the communications device determines whether to transmit a first message 3 or a second message 3 based on the indication information, and schedules a transferring of the first message 3 or the second message 3 based on the scheduling information, wherein the first message 3 does not carry user data, and the second message 3 carries the user data, wherein a bit state 1111 of the first modulation and coding scheme field indicates the communications device to transmit the second message 3; and
transmitting, by the communications device, the first message 3 or the second message 3 based on the scheduling information and the indication information.

2. An information receiving method comprising:
sending, by a network device, first downlink control information (DCI) in a DCI format 6-0B to a communications device, wherein the first DCI comprises scheduling information, indication information, and a first modulation and coding scheme field, wherein the indication information is carried by the first modulation and coding scheme field, wherein the indication information indicates the communications device to transmit a first message 3 or a second message 3, and wherein the scheduling information indicates the communications device to schedule a transferring of the first message 3 or the second message 3, wherein the first message 3 does not carry user data, and the second message 3 carries the user data, wherein a bit state 1111 of the first modulation and coding scheme field indicates the communications device to transmit the second message 3; and receiving, by the network device, the first message 3 or the second message 3 from the communications device based on the scheduling information.

3. A communications device, comprising:
a processor;
a memory;
a transmitter; and
a receiver;
wherein the memory is to store instructions, which, when executed by the processor, cause the communications device to:
receive first downlink control information (DCI) in a DCI format 6-0B through the receiver, wherein the first DCI comprises scheduling information, indication information, and a first modulation and coding scheme field, wherein the indication information is carried by the first modulation and coding scheme field, wherein the communications device determines whether to transmit a first message 3 or a second message 3 based on the indication information, and schedules a transferring of the first message 3 or the second message 3 based on the scheduling information, wherein the first message 3 does not carry user data, and the second message 3 carries the user data, wherein a bit state 1111 of the first modulation and coding scheme field indicates the communications device to transmit the second message 3; and
transmit the first message 3 or the second message 3 based on the scheduling information and the indication information through the transmitter.

4. A network device, comprising:
a processor;
a memory;
a transmitter; and
a receiver;
wherein the memory is to store instructions, which, when executed by the processor, cause the network device to:
send first downlink control information (DCI) in a DCI format 6-0B through the transmitter to a communications device, wherein the first DCI comprises scheduling information, indication information, and a first modulation and coding scheme field, wherein the indication information is carried by the first modulation and coding scheme field, wherein the indication information indicates the communications device to transmit a first message 3 or a second message 3, and wherein the scheduling information indicates the communications device to schedule a transferring of the first message 3 or the second message 3, and wherein the first message 3 does not carry user data, and the second message 3 carries the user data, wherein a bit state 1111 of the first modulation and coding scheme field indicates the communications device to transmit the second message 3; and
receive, based on the scheduling information, the first message 3 or the second message 3 from the communications device through the receiver.

* * * * *